(12) United States Patent
Weber et al.

(10) Patent No.: US 9,344,536 B2
(45) Date of Patent: May 17, 2016

(54) ACCESSORY ATTACHMENT MECHANISMS FOR AN ELECTRONIC DEVICE

(75) Inventors: Trent Weber, San Francisco, CA (US); Stephen B. Lynch, Portola Valley, CA (US); Emery A. Sanford, San Francisco, CA (US); Tyson B. Manullang, Sunnyvale, CA (US); David G. Havskjold, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 583 days.

(21) Appl. No.: 13/607,635

(22) Filed: Sep. 7, 2012

(65) Prior Publication Data
US 2014/0068919 A1    Mar. 13, 2014

(51) Int. Cl.
| | | |
|---|---|---|
| *A45D 19/04* | (2006.01) | |
| *A47J 47/16* | (2006.01) | |
| *F16M 11/00* | (2006.01) | |
| *H04M 1/02* | (2006.01) | |

(52) U.S. Cl.
CPC ........ H04M 1/0202 (2013.01); *Y10T 29/49947* (2015.01); *Y10T 403/602* (2015.01)

(58) Field of Classification Search
CPC ... H04M 1/0202; Y10T 403/602; H05K 5/00; A45F 3/14; A45F 2003/142; F16H 53/02; F16H 53/025; F16H 53/04; F16H 53/06; F16H 53/08; F16M 11/24; F16M 11/04
USPC ........ 224/255; 200/528, 527; 403/109.5, 342, 403/434, 309.1; 248/205.8; 455/57.1, 455/576.6, 575.7, 90.3
See application file for complete search history.

(56) References Cited

U.S. PATENT DOCUMENTS

| | | | | |
|---|---|---|---|---|
| 3,792,219 | A | * | 2/1974 | Rowley ................. H01H 13/12 200/276 |
| 5,106,248 | A | * | 4/1992 | Harris .................. B63B 21/045 114/218 |
| 5,167,364 | A | | 12/1992 | Wenning |
| 5,507,423 | A | | 4/1996 | Fischer et al. |
| 6,094,566 | A | * | 7/2000 | Dasent .................. A45C 13/26 455/575.6 |
| 6,305,588 | B1 | * | 10/2001 | Michel ..................... A45F 5/02 224/195 |
| 7,433,724 | B2 | | 10/2008 | Ni et al. |
| 7,904,128 | B2 | | 3/2011 | Harmon et al. |
| 8,177,107 | B2 | | 5/2012 | Kecskes |

(Continued)

FOREIGN PATENT DOCUMENTS

TW    201224634 A    6/2012
WO   WO03045187 A1   6/2003

OTHER PUBLICATIONS

PCT Application No. PCT/US2013/057720—International Search Report and Written Opinion dated Dec. 12, 2013.

(Continued)

*Primary Examiner* — Christopher Garft
(74) *Attorney, Agent, or Firm* — Downey Brand LLP

(57) ABSTRACT

Attachment mechanisms that may be employed to attach accessory devices to electronic devices are provided. The attachment mechanism may include a displaceable post that is moveable between deployed and stored configurations. In the deployed configuration an accessory may be attached to the displaceable post, whereas in the stored configuration the displaceable post may be at least partially inaccessible. Movement of the displaceable post may be controlled by cam surfaces, a spring, and a follower. The spring may be conical and configured to fold flat to reduce the height of the attachment mechanism.

22 Claims, 35 Drawing Sheets

(56) References Cited

U.S. PATENT DOCUMENTS

| | | | | |
|---|---|---|---|---|
| 8,238,843 B2* | 8/2012 | Nakao | ............... | A45C 13/30 16/428 |
| 9,143,668 B2 | 9/2015 | Mathew et al. | | |
| 2008/0061058 A1* | 3/2008 | Wang | ............... | H04M 1/0216 220/4.02 |
| 2009/0143116 A1* | 6/2009 | Harmon | ............... | G06F 1/1616 455/575.6 |
| 2009/0245931 A1* | 10/2009 | Stiehl | ............... | A45C 13/30 403/322.2 |
| 2009/0290296 A1 | 11/2009 | Stiehl et al. | | |
| 2010/0124957 A1* | 5/2010 | Williams | ............... | A45F 5/02 455/575.6 |
| 2010/0270345 A1 | 10/2010 | Kecskes | | |
| 2010/0304797 A1* | 12/2010 | Yang | ............... | A45F 5/00 455/575.1 |
| 2011/0108695 A1* | 5/2011 | Wang | ............... | F16M 11/12 248/284.1 |
| 2011/0136555 A1* | 6/2011 | Ramies | ............... | B67B 7/16 455/575.8 |
| 2011/0284599 A1* | 11/2011 | Sternick | ............... | A45F 5/00 224/191 |
| 2011/0286160 A1 | 11/2011 | Duan et al. | | |

OTHER PUBLICATIONS

Taiwanese Patent Application No. 102132270—Office Action dated Sep. 17, 2015.

* cited by examiner

ACCESSORY ATTACHMENT MECHANISMS FOR AN ELECTRONIC DEVICE

TECHNICAL FIELD

The present disclosure relates generally to attachment mechanisms, and more particularly to attachment mechanisms configured to attach an accessory device to an electronic device.

BACKGROUND

Various methods and apparatuses have been developed for coupling accessory devices to other items. For example, eyelets, hook and loop fasteners, threaded fasteners, and other mechanisms have been developed for this purpose. Such mechanisms are employed in a wide variety of applications.

By way of example, in the field of electronic devices, lanyards may be coupled thereto by looping the lanyard through an eyelet coupled to the electronic device to provide a user with a way to secure the device to his or her hand. Further, electronic devices such as cameras may include a female threaded boss configured to receive a male threaded member of a tripod. However, existing embodiments of mechanisms configured to couple accessory devices to devices such as electronic devices may prove unsatisfactory to a user. In this regard, existing embodiments of such mechanisms may detract from the aesthetic appeal of the device or alter the form factor of the device to a less desirable configuration.

Accordingly, improved apparatuses and methods for attaching accessory devices may be desirable.

SUMMARY

Attachment mechanisms configured to couple accessory devices such as lanyards to electronic devices are provided. Various embodiments thereof are described. However, in one example embodiment, an attachment mechanism includes a displaceable post that is moveable between deployed and stored configurations. The displaceable post includes an enlarged head to which an accessory device may be mounted. In the stored configuration, the displaceable post is retracted such that the enlarged head is at least partially inaccessible. For example, the enlarged head may define a smooth surface with the surrounding housing of the electronic device such that the attachment mechanism does not adversely affect the cosmetic appearance of the electronic device. However, when the displaceable post is moved outwardly to the deployed configuration, the enlarged head is exposed and accessible, such that an accessory device may be coupled thereto.

The attachment mechanism may include a variety of mechanisms that allow for movement of the displaceable post between the deployed and stored and configurations. For example, a follower may interact with one or more cam surfaces. Further, a spring may retain the displaceable post in the deployed and stored configurations. The spring may be conical and configured to compress into a flat configuration such that the height of the attachment mechanism may be reduced. The attachment mechanism may provide resistance and/or an audible click that provides a user with feedback during movement between the deployed and stored configurations. Related methods are also provided.

Other apparatuses, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed assemblies, methods, and systems. These drawings in no way limit any changes in form and detail that may be made to the disclosure by one skilled in the art without departing from the spirit and scope of the disclosure.

DETAILED DESCRIPTION

Example applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details. In other instances, well known process steps have not been described in detail in order to avoid unnecessarily obscuring the present disclosure. Other applications are possible, such that the following examples should not be taken as limiting.

Figure 1:
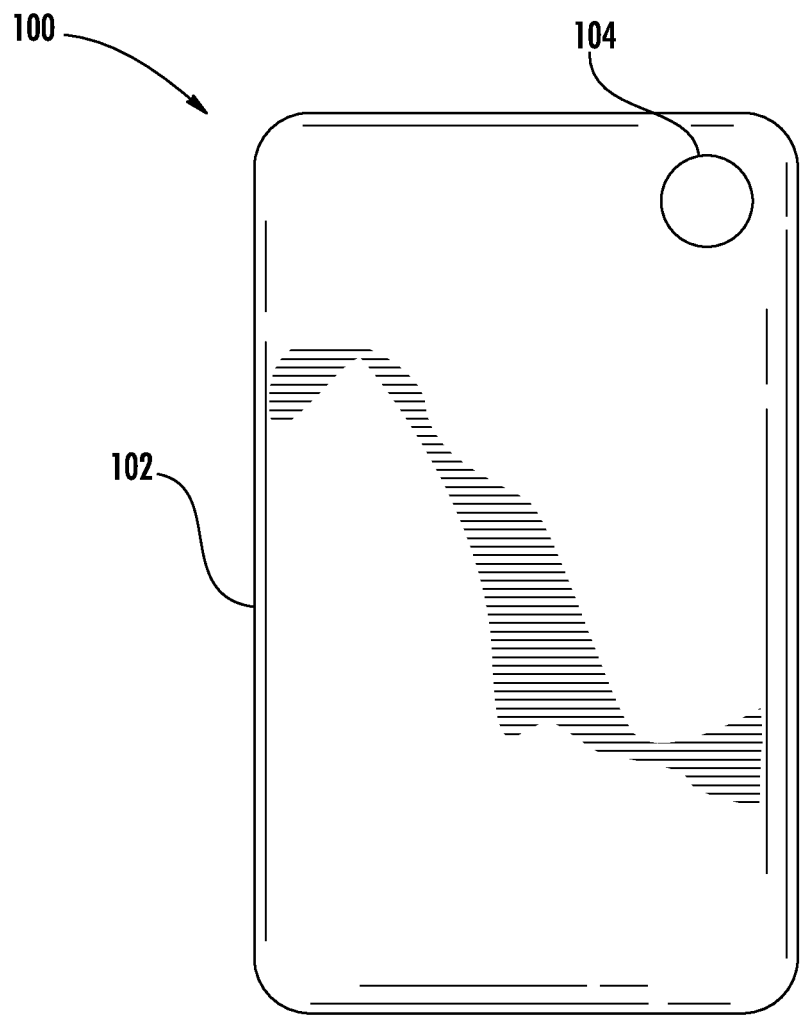
FIG. 1 illustrates an electronic device including an attachment mechanism according to an example embodiment of the present disclosure.

Attachment mechanisms may be employed for a variety of purposes. In this regard, FIG. 1 illustrates an embodiment of an electronic device 100. The electronic device 100 may comprise a housing 102 and an attachment mechanism 104. The attachment mechanism 104 may be configured to engage an accessory device, such as a lanyard.

Figure 2:
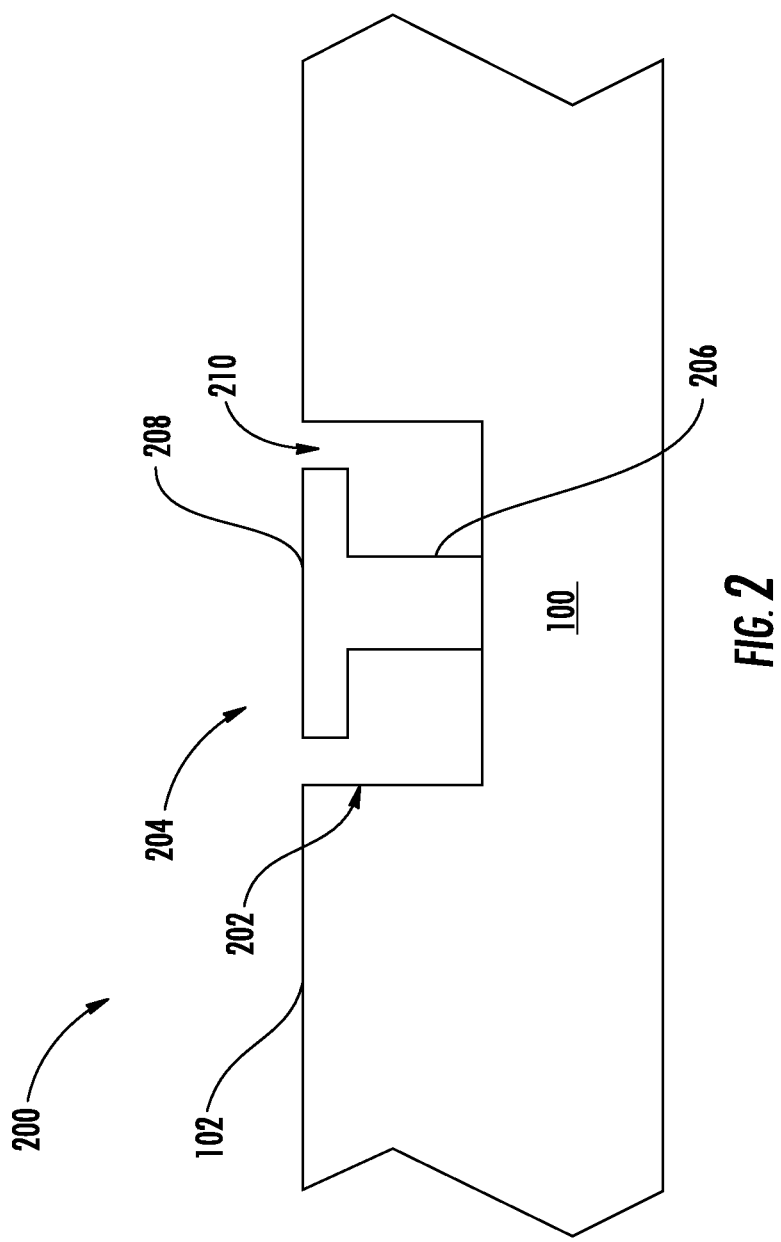
FIG. 2 illustrates an embodiment of an attachment mechanism comprising a post in a recess according to an example embodiment of the present disclosure.

Various embodiments of attachment mechanisms may be employed to couple an accessory device to the electronic device 100. However, by way of example, FIG. 2 illustrates an embodiment of an attachment mechanism 200, which may be employed to couple an accessory device such as a lanyard thereto. In this regard, the housing 102 of the electronic device 100 may define a recess 202 in which a post 204 defining a shaft 206 and an enlarged head 208, which is larger in one or more dimensions than the shaft, is positioned. A gap 210 is provided between the enlarged head 208 of the post 204 and the housing 102.

Figure 3:
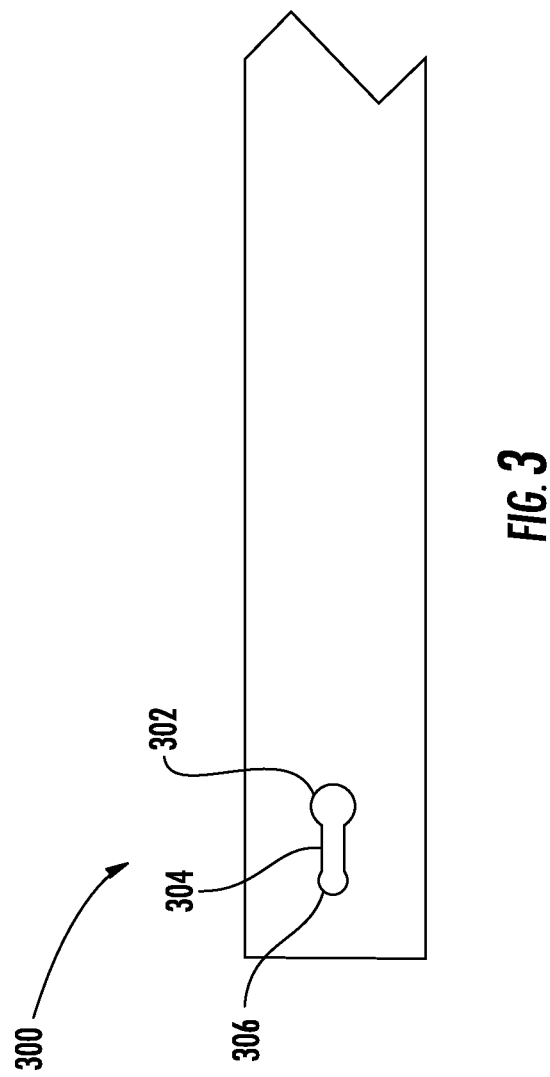
FIG. 3 illustrates a lanyard accessory device according to an example embodiment of the present disclosure.

A lanyard 300 that may be employed in conjunction with attachment mechanisms is illustrated in FIG. 3. The lanyard 300 may define a relatively large aperture 302, a connector aperture 304, and a relatively small aperture 306. In use, a user may slide the large aperture 302 over the enlarged head 208 of the post 204 and through the gap 210. The lanyard 300 may then slide down to the shaft 206 portion of the post 204. The user may then pull on the lanyard 300 to move the shaft 206 through the connector aperture 304 into the small aperture 306, wherein the shaft may be retained. Accordingly, the lanyard 300 may be secured to the attachment mechanism 200. Note that although the attachment mechanisms discussed herein are generally described in terms of use in attaching lanyards to electronic devices, it should be understood that the attachment mechanisms discussed herein may be employed to attach various other embodiments of accessory devices to various other embodiments of devices.

Figure 4:
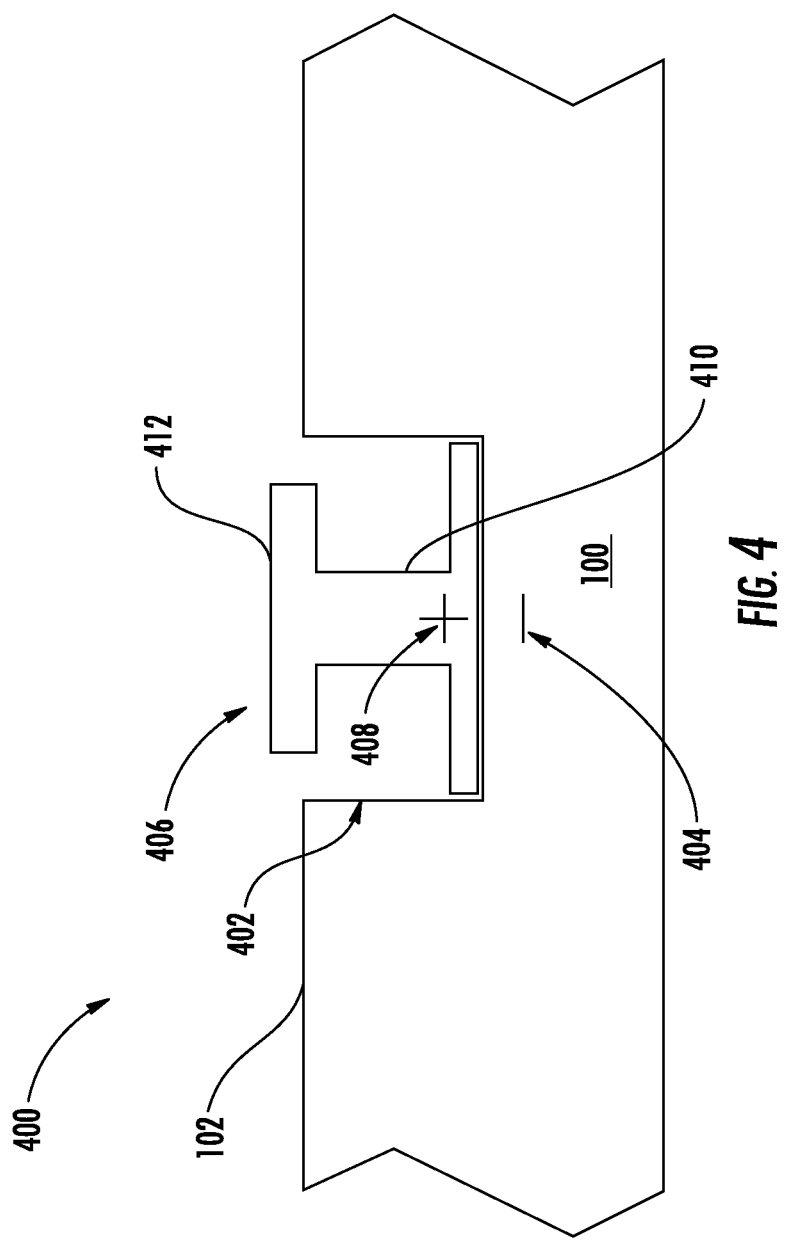
FIG. 4 illustrates an attachment mechanism comprising a post magnetically secured in a recess according to an example embodiment of the present disclosure.

An alternate embodiment of an attachment mechanism 400 is illustrated in FIG. 4. As illustrated, the housing 102 of the electronic device 100 may define a recess 402. A magnetic field 404 may be defined proximate the recess 402. Accordingly, a post 406 defining an opposing magnetic field 408 may be received and secured therein. The post 406 may include a shaft 410 and an enlarged head 412, as discussed above. Alternatively an accessory device may be directly received in the recess 402.

Figure 5:
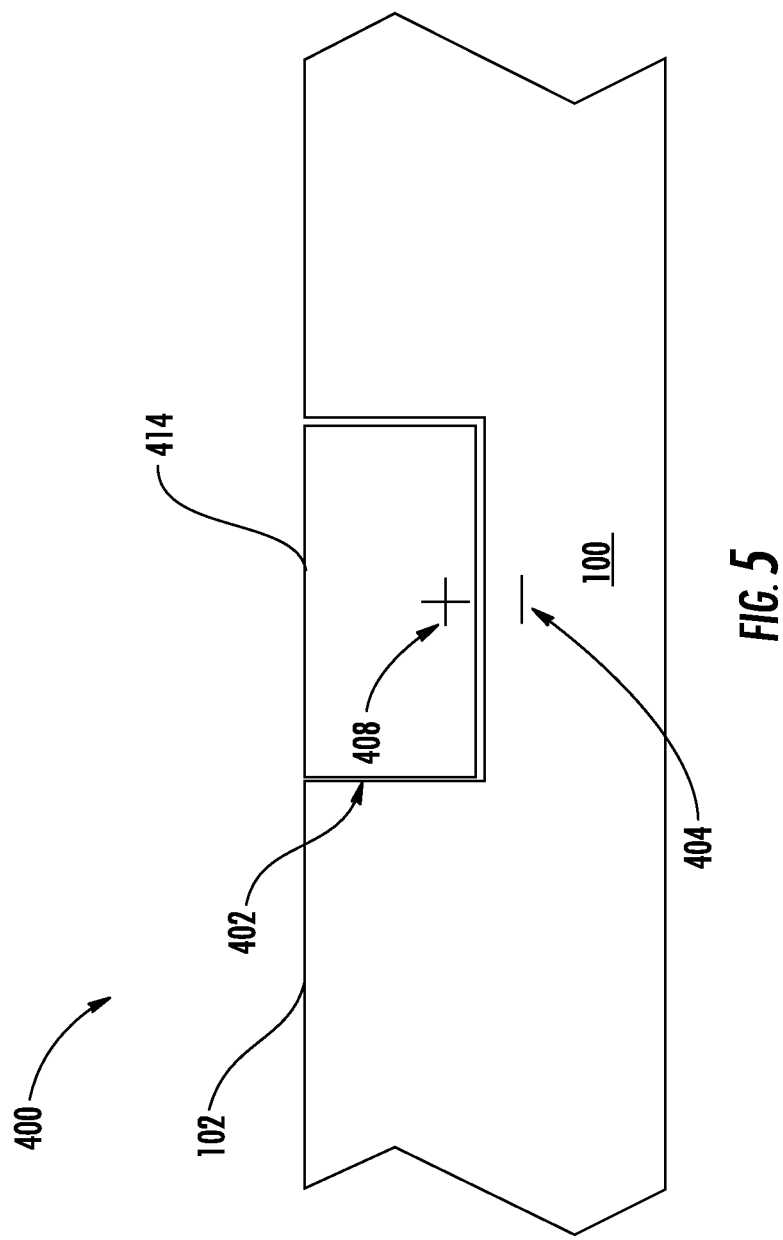
FIG. 5 illustrates a filler element magnetically received in the recess of FIG. 4 according to an example embodiment of the present disclosure.

However, when an accessory device is not needed, a filler element 414 with the same opposing magnetic field 408 may be received in the recess 402, as illustrated in FIG. 5. The filler element 414 may serve to fill the recess 402 until an accessory device is needed. Thereby, as illustrated, a pleasing cosmetic appearance that hides the recess 402 may be provided. For example, the filler element 414 may be substantially flush with the surface of the housing 102.

The attachment mechanisms 200, 400 described above may be substantially stationary. Accordingly, the operation thereof is relatively simple. However, stationary attachment mechanisms may be undesirable for cosmetic purposes and/or for ease of use thereof. In this regard, providing attachment mechanisms in recesses may alleviate some cosmetic issues, but may still prove unsatisfactory. Thus, embodiments of attachment mechanisms configured to move between deployed and stored configurations are provided herein.

Figure 6:
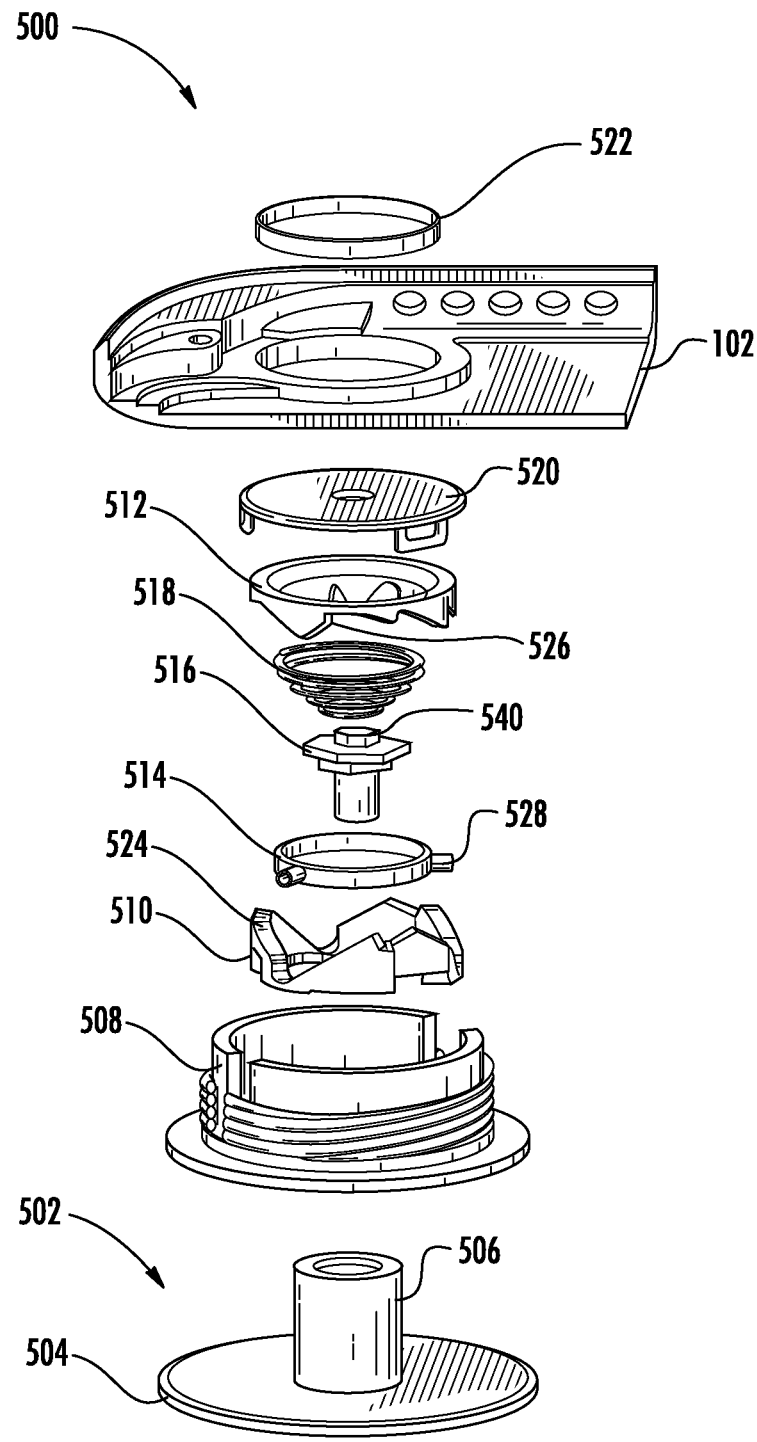
FIG. 6 illustrates an exploded view of an attachment mechanism comprising first and second longitudinally displaced cam members, a spring, and a follower according to an example embodiment of the present disclosure.
Figure 7:
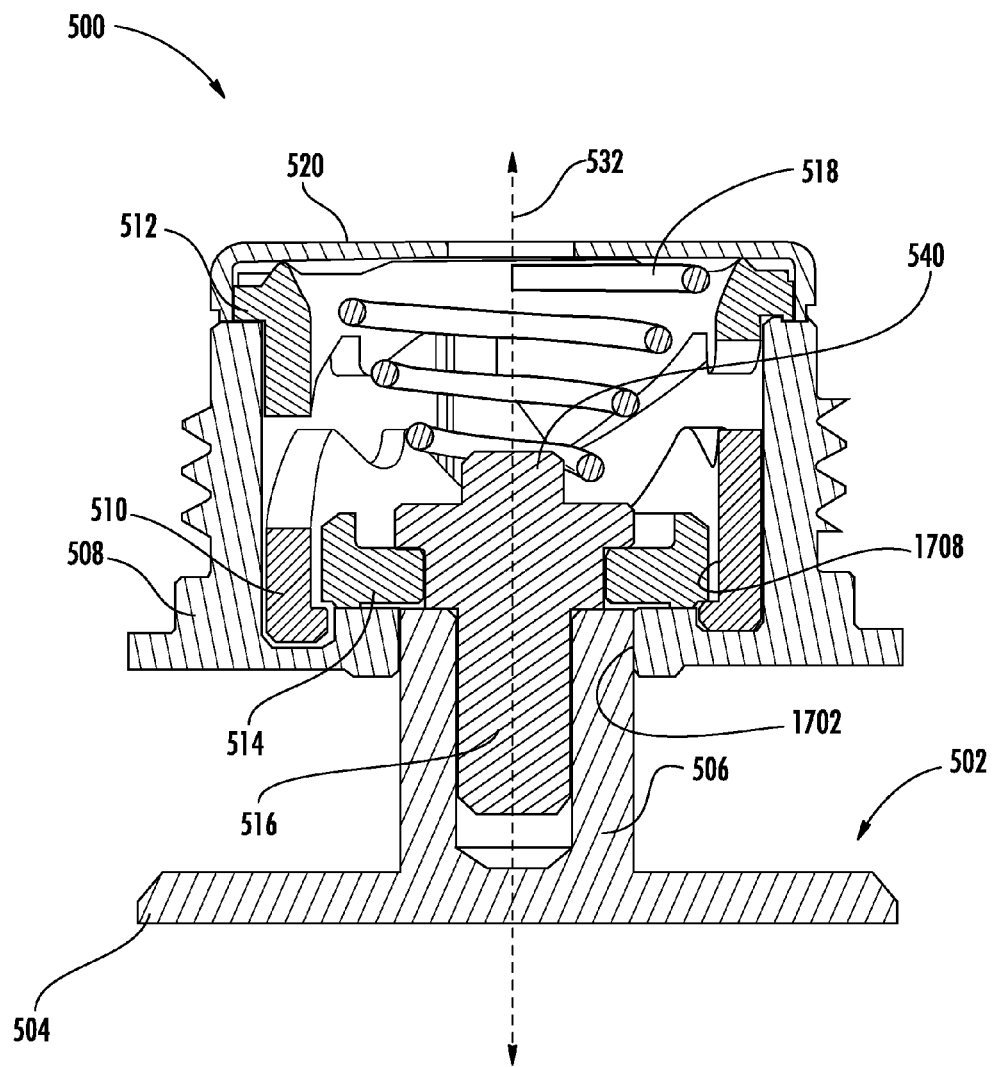
FIG. 7 illustrates a sectional view through the attachment mechanism of FIG. 6.

In this regard, FIG. 6 illustrates an exploded view of an embodiment of an attachment mechanism 500 configured to move between deployed and stored configurations. FIG. 7 illustrates the attachment mechanism 500 in an assembled and deployed configuration. As illustrated, the attachment mechanism 500 may include a displaceable post 502 comprising an attachment member in the form of an enlarged head 504 coupled to a shaft 506. The attachment mechanism 500 may further comprise a displacement mechanism comprising a mount 508, first and second cam members 510, 512, a follower 514, a fastener 516, a spring 518, and a cap 520. The fastener 516 may couple the follower 514 to the displaceable post 502, although the fastener may couple to the follower such that the follower may be rotatable relative to the displaceable post. In this regard, the displaceable post 502 may be rotatable relative to the housing 102 and the displacement mechanism in some embodiments. The cap 520 may hold the first and second cam members 510, 512, the follower 514, the fastener 516, and the spring 518 in the mount 508. The attachment mechanism 500 may be coupled to the housing 102 of the electronic device 100 via a nut 522.

The first cam member 510 may define a first cam surface 524, and the second cam member 512 may define a second cam surface 526. The follower 514 may define one or more protrusions 528 configured to move against and travel between the first cam surface 524 and the second cam surface 526. The interaction between the follower 514 and the cam members 510, 512 may control the movement of the displaceable post 502.

Figure 8:
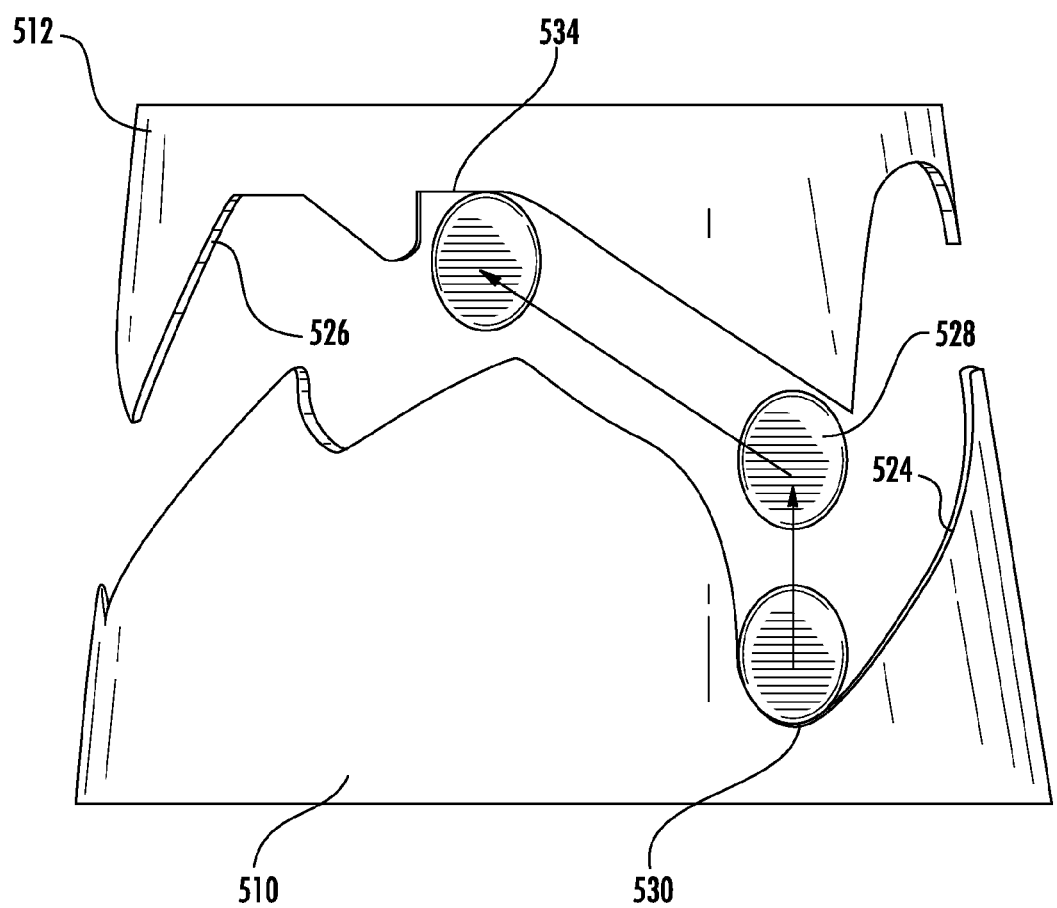
FIG. 8 illustrates movement of the follower of FIG. 6 from a deployed position to an over-travel position.

In this regard, FIGS. 8-11 illustrate movement of the protrusion 528 of the follower 514 with respect to the cam surfaces 524, 526 of the cam members 510, 512 during movement of the displaceable post 502 between deployed and stored configurations. In particular, FIG. 8 illustrates movement of the protrusion 528 of the follower 514 during movement from the deployed configuration to an over-travel position. Initially, the protrusion 528 is pressed against the first cam surface 524 and sits in a deployed recess 530, as a result of the spring 518 acting thereon through the fastener 516.

As a user depresses the enlarged head 504 of the displaceable post 502 inwardly along a longitudinal axis 532 defined by the displaceable post (see, FIG. 7), the protrusion 528 lifts off of the first cam surface 524 out of the deployed recess 530 and then comes into contact with the second cam surface 526. In this regard, the first cam member 510 and the second cam member 512 are displaced from one another along the longitudinal axis 532. The second cam surface 526 defines an angle relative to the longitudinal axis 532, such that the protrusion 528 moves therealong to a first over-travel recess 534 when the protrusion contacts the second cam member 512.

Figure 9:
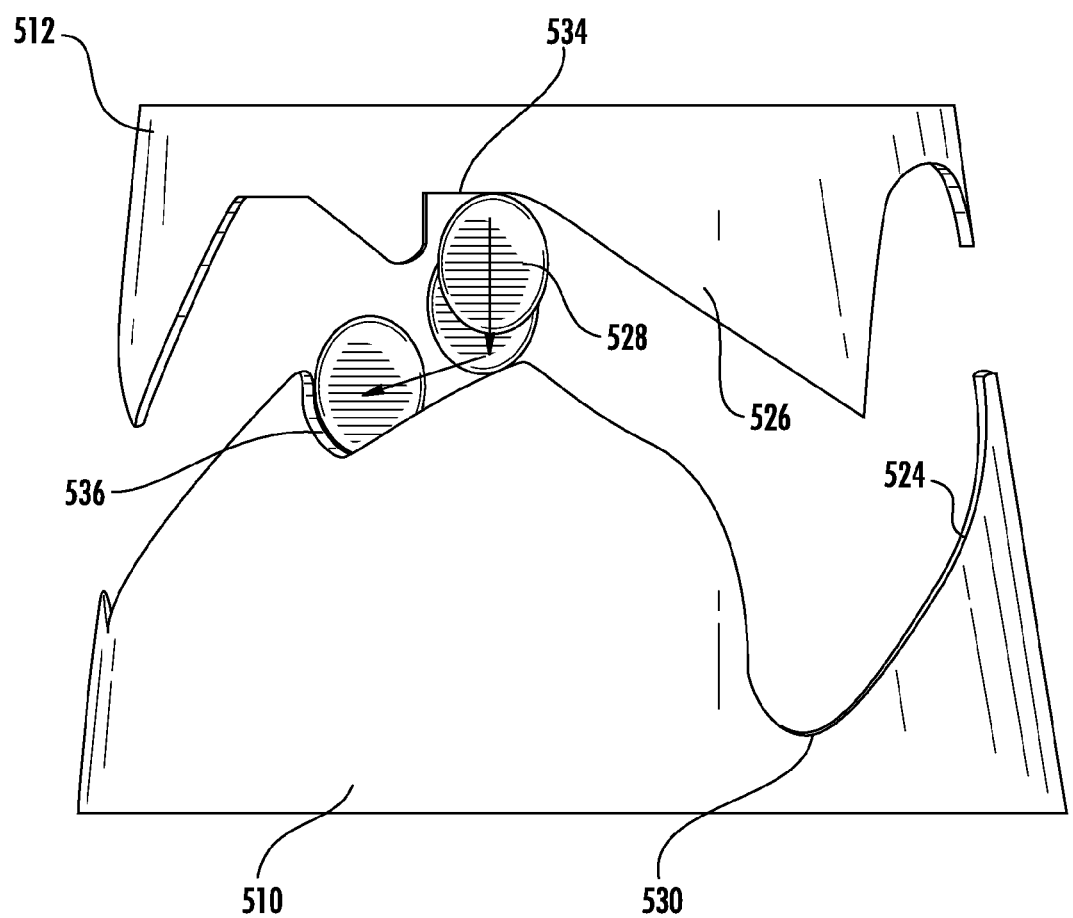
FIG. 9 illustrates movement of the follower of FIG. 6 from the over-travel position to a recessed position.

As illustrated in FIG. 9, when the enlarged head 504 is released by the user, the spring 518 displaces the follower 514 out of the first over-travel recess 534 along the longitudinal axis 532 until the protrusion 528 contacts the first cam surface 524. The protrusion 528 then follows the first cam surface 524 and stops at a stored recess 536 in which the displaceable post 502 is at least partially recessed in the displacement mechanism and the enlarged head 504 is at least partially inaccessible.

Figure 10:
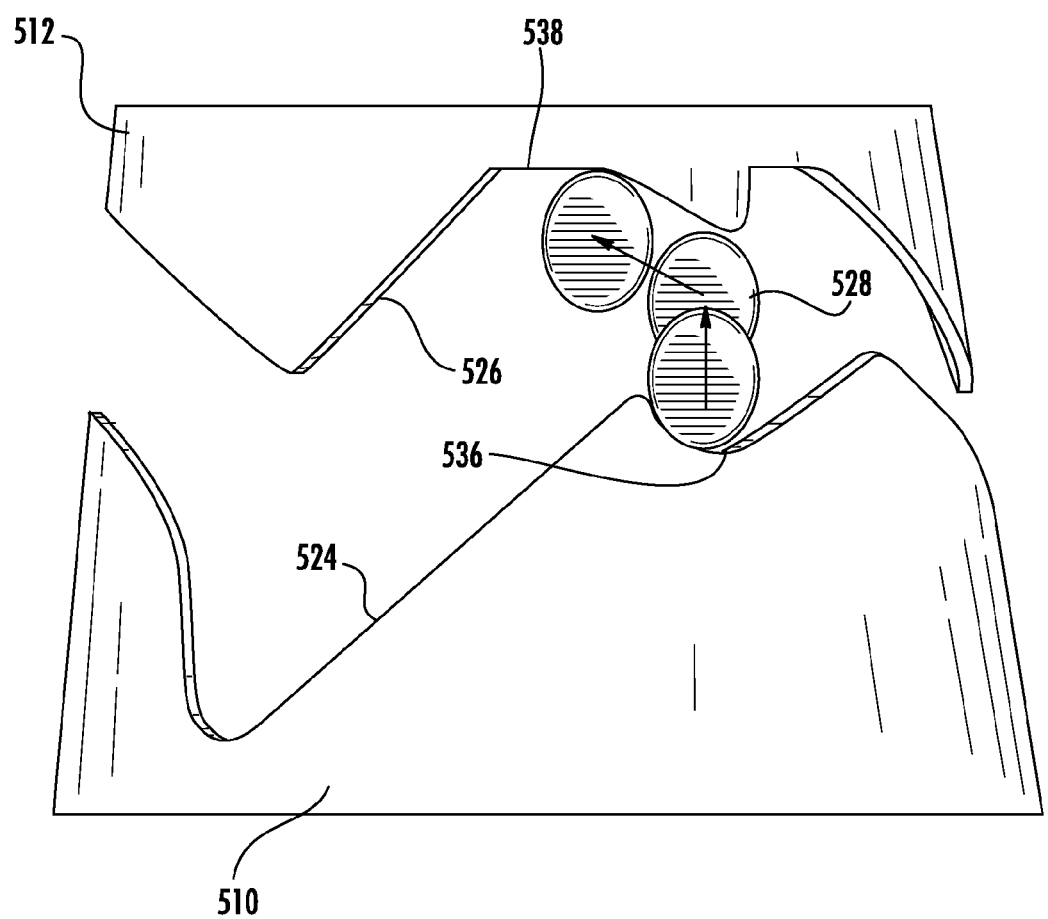
FIG. 10 illustrates movement of the follower of FIG. 6 from the recessed position to a second over-travel position.

FIG. 10 illustrates movement of the protrusion 528 from the stored configuration when the user depresses the enlarged head 504 of the displaceable post 502. As illustrated, the follower 514 is displaced along the longitudinal axis 532 until the protrusion 528 contacts the second cam surface 526. As a result of the second cam surface 526 defining an angle with respect to the longitudinal axis 532 at this location, the protrusion 528 travels therealong until the protrusion reaches a second over-travel recess 538.

Figure 11:
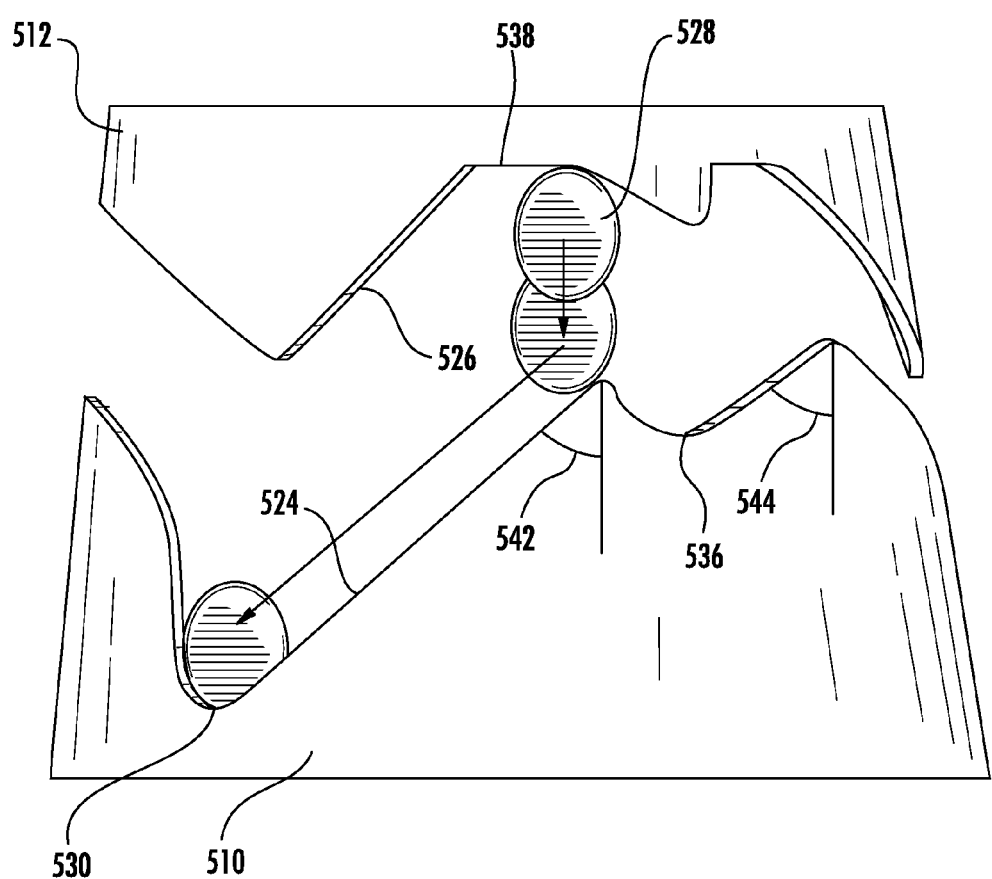
FIG. 11 illustrates movement of the follower of FIG. 6 from the second over-travel position to the deployed position.

As illustrated in FIG. 11, when the user releases the displaceable post 502, the follower 514 travels along the longitudinal axis 532 until the protrusion 528 contacts the first cam surface 524. As a result of the first cam surface 524 defining an angle with respect to the longitudinal axis 532 at this location, the protrusion 528 travels therealong until it returns to the deployed recess 530. Accordingly, the displaceable post 502 is returned to the initial deployed configuration.

Note that as the displaceable post 502 is moved between the deployed and stored configurations, the follower 514 will eventually fully rotate about the longitudinal axis 532 defined by the displaceable post. The fastener 516 may fixedly couple the follower 514 to the displaceable post 502, such that the displaceable post rotates with the follower. Alternatively, the fastener 516 may couple the follower 514 to the displaceable post 502 such that the follower may rotate without the displaceable post rotating or vice versa.

Note that embodiments of the attachment mechanisms provided herein that allow for rotation of the displaceable post without rotation of the parts of the displacement mechanism may be beneficial in that this may prevent the transmission of stresses to the displacement mechanism from the displaceable post resulting from rotational movement of the displaceable post (e.g., due to rotation of an accessory device connected thereto). Conversely, embodiments of the attachment mechanisms provided herein that do not allow for rotation of the displaceable post relative to all or a portion of the displacement mechanism may be beneficial in that this may allow for aligned coupling with an accessory device based on an angular position thereof.

Returning to FIG. 7, the fastener 516 may also define an extension 540 that engages an end of the spring 518. By engaging the end of the spring 518, the fastener 516 may retain the spring in place. In contrast, a typical screw fastener may define a recess at a top thereof. As illustrated, in some embodiments the spring 518 may be conical. The conical configuration may allow the spring 518 to compress flat to a height along the longitudinal axis 532 that is relatively small. For example, the height may be equal to the diameter of the wire defining the spring. In this regard, the pitch of the spring 518 and the diameter thereof may be configured such that the spring may compress flat in this manner. In contrast a cylindrical spring may not compress flat in this manner. Accordingly, use of a spring 518 defining a conical configuration may reduce the size of the attachment mechanism 500, which may be beneficial in an electronic device. In this regard, as illustrated in FIG. 1, the attachment mechanisms described herein may be configured such that the displacement mechanism extends into a major surface of the electronic device (e.g. with a displaceable post extending perpendicularly to the major surface). Since the electronic device may define a relatively small dimension in this direction, in order to satisfy consumer demand for thin electronic devices, attachment mechanisms defining a relatively small height as described above may be desirable.

Note, as illustrated in FIG. 11, that an angle 542 of the first cam surface 524 configured to direct the follower 514 toward the deployed configuration may be greater than an angle 544 of the first cam surface configured to direct the follower toward the stored configuration. In this regard, the relatively steeper angle 542 of the first cam surface 524 may make it easier for the spring 518 to direct the protrusion into the deployed recess 530, since the spring is more fully decompressed as it moves to the deployed configuration, as opposed to the stored configuration. Accordingly, the steeper angle 542 may offset the reduced spring force provided by the spring 518 during movement to the deployed configuration.

Figure 12:
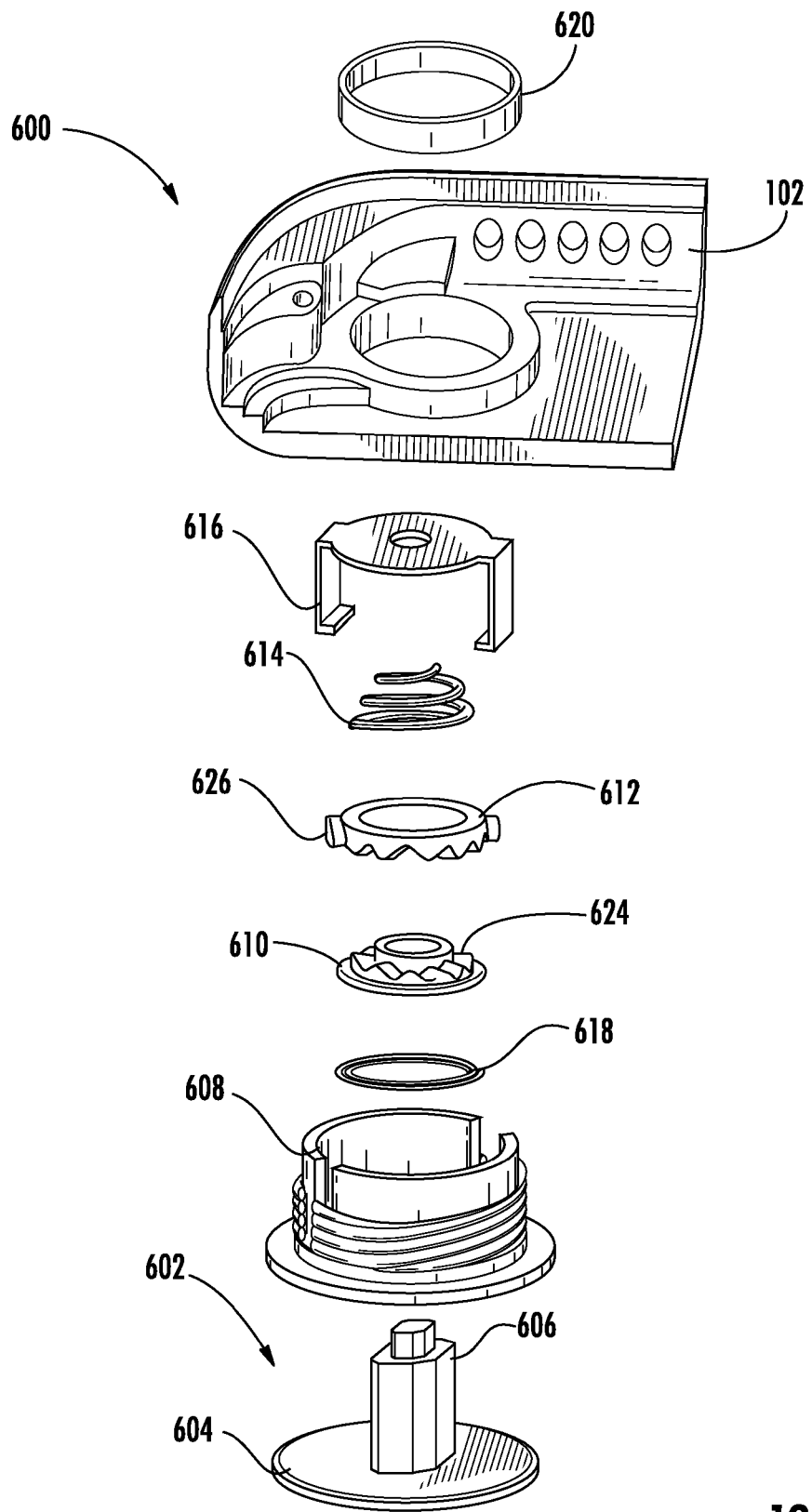
FIG. 12 illustrates an exploded view of an attachment mechanism comprising a cam member, two springs, and a follower according to an example embodiment of the present disclosure.
Figure 13:
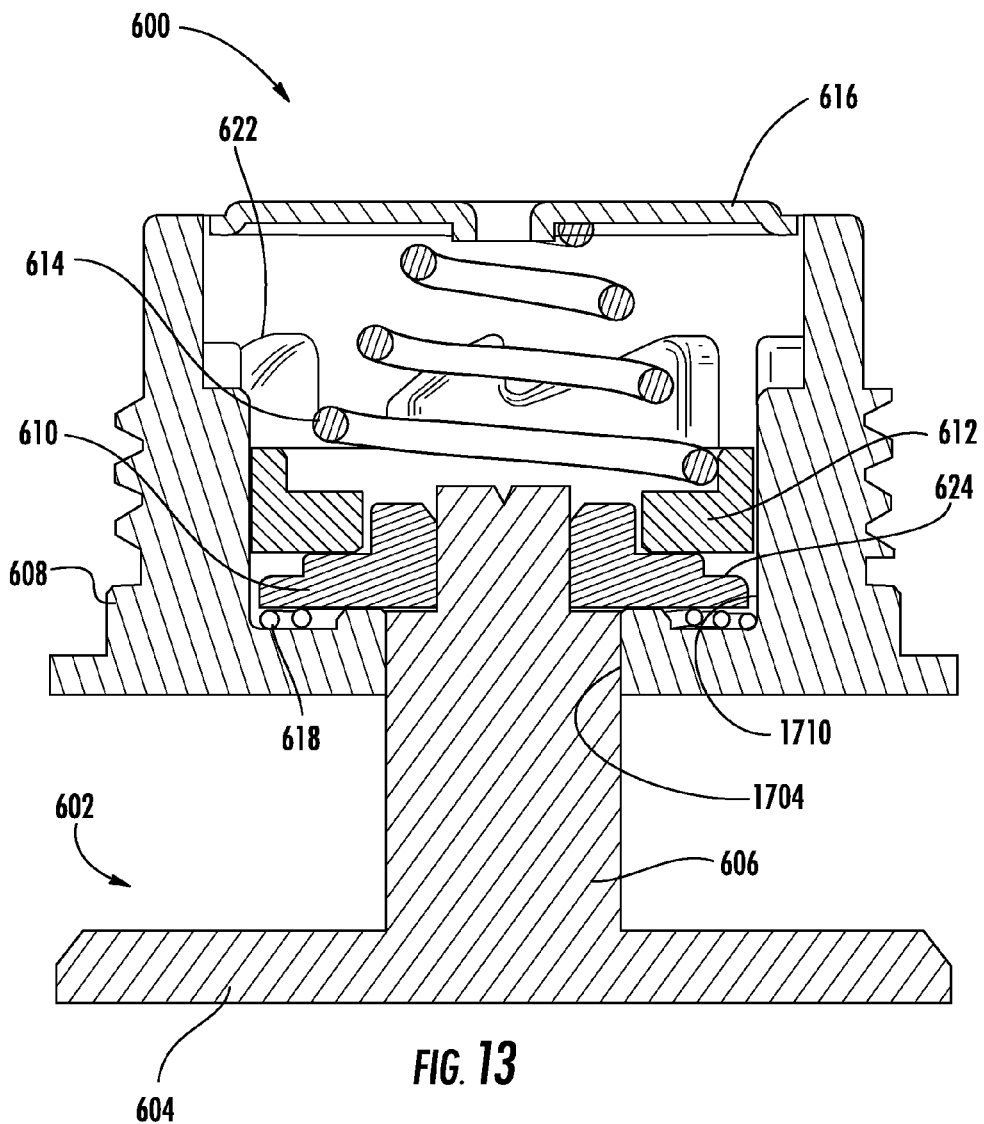
FIG. 13 illustrates a section view through the attachment mechanism of FIG. 12.

FIG. 12 illustrates an exploded view of an alternate embodiment of an attachment mechanism 600 configured to move between deployed and stored configurations. FIG. 13 illustrates the attachment mechanism 600 in an assembled and deployed configuration. As illustrated, the attachment mechanism 600 may include a displaceable post 602 comprising an attachment member in the form of an enlarged head 604 coupled to a shaft 606. The attachment mechanism 600 may further comprise a displacement mechanism comprising a mount 608, a cam member 610, a follower 612, a spring 614, and a cap 616. The displacement mechanism may further comprise a second spring 618. The cap 616 may hold the cam member 610, the follower 612, the spring 614, and the second spring 618 in the mount 608. The attachment mechanism 600 may be coupled to the housing 102 of the electronic device 100 via a nut 620.

The mount 608 or a separate cam member received therein may define a first cam surface 622, as illustrated in FIG. 13. Further, as illustrated in FIG. 12, the cam member 610 may define a second cam surface 624. The follower 612 may define one or more protrusions 626 configured to move against the first cam surface 622 and the second cam surface 624. The interaction between the follower 612, the cam member 610, and the mount 608 may control the movement of the displaceable post 602.

Figure 14:
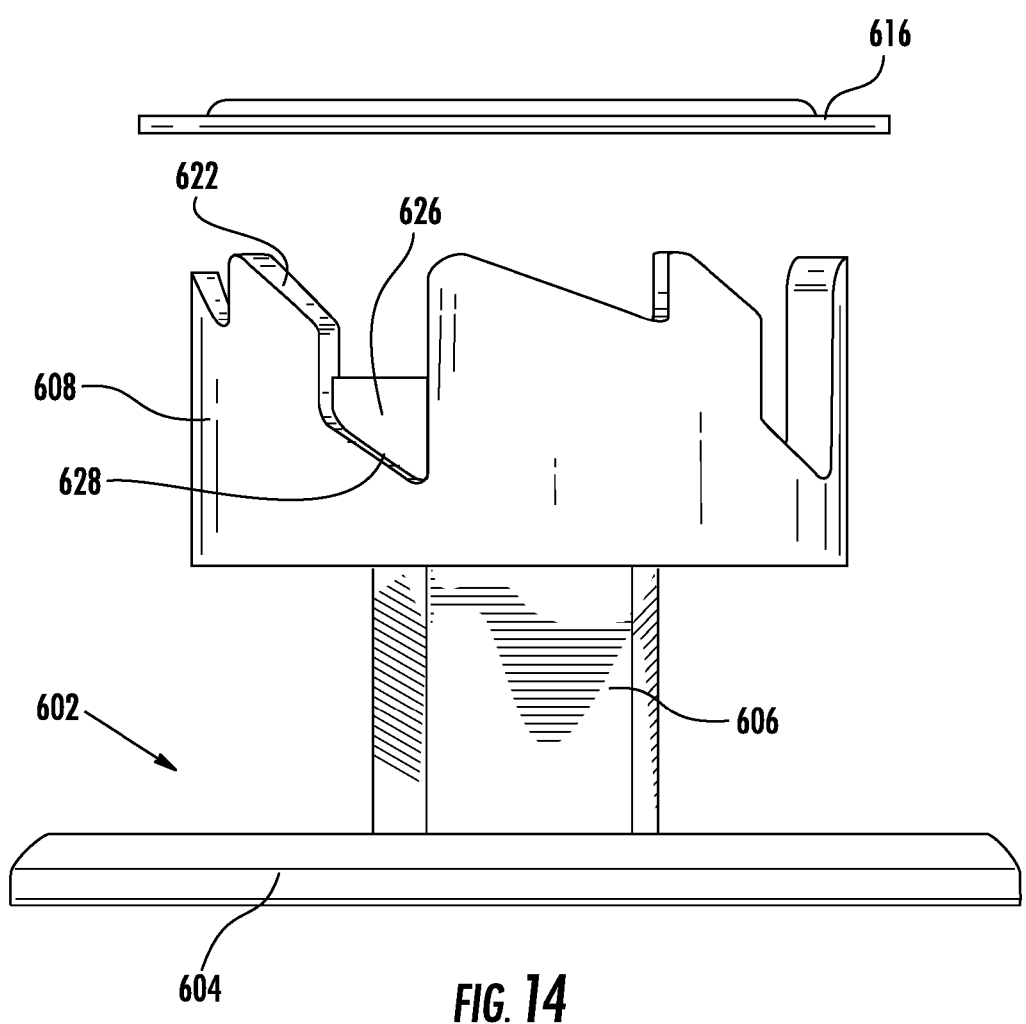
FIG. 14 illustrates the follower of FIG. 12 in a deployed position.

In this regard, FIGS. 14-17 illustrate movement of the follower 612 with respect to the cam surfaces 622, 624 during movement of the displaceable post 602 between deployed and stored configurations. In particular, FIG. 14 illustrates the displaceable post 602 in a deployed configuration in which the displaceable post extends from the displacement mechanism and the enlarged head 604 is exposed. As illustrated, in the deployed configuration the protrusion 626 defined by the follower 612 is received in a deployed recess 628 defined by the first cam surface 622, and held therein by the spring 614.

Figure 15:
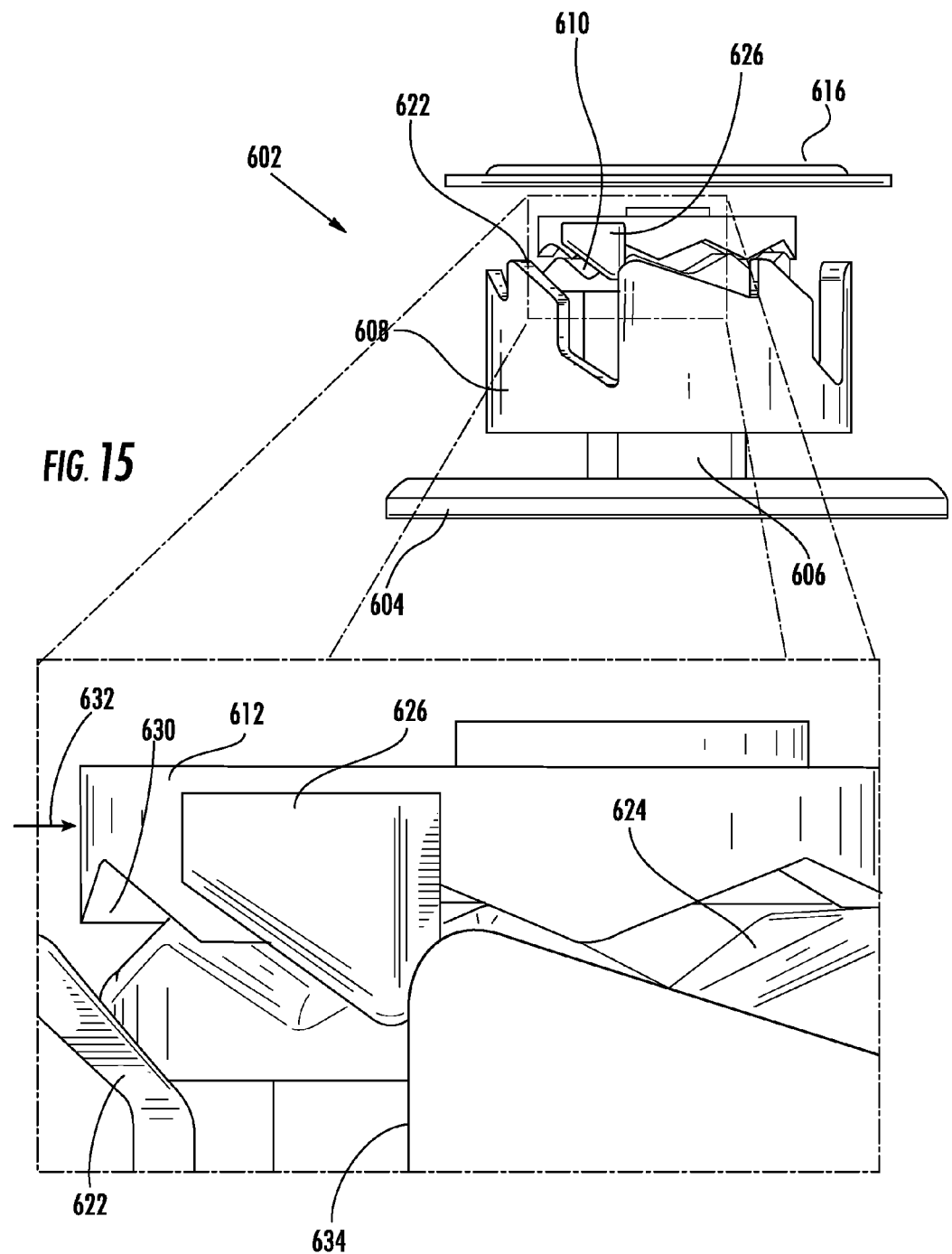
FIG. 15 illustrates the position of the follower of FIG. 12 during movement from the deployed position prior to separation from a wall.
Figure 16:
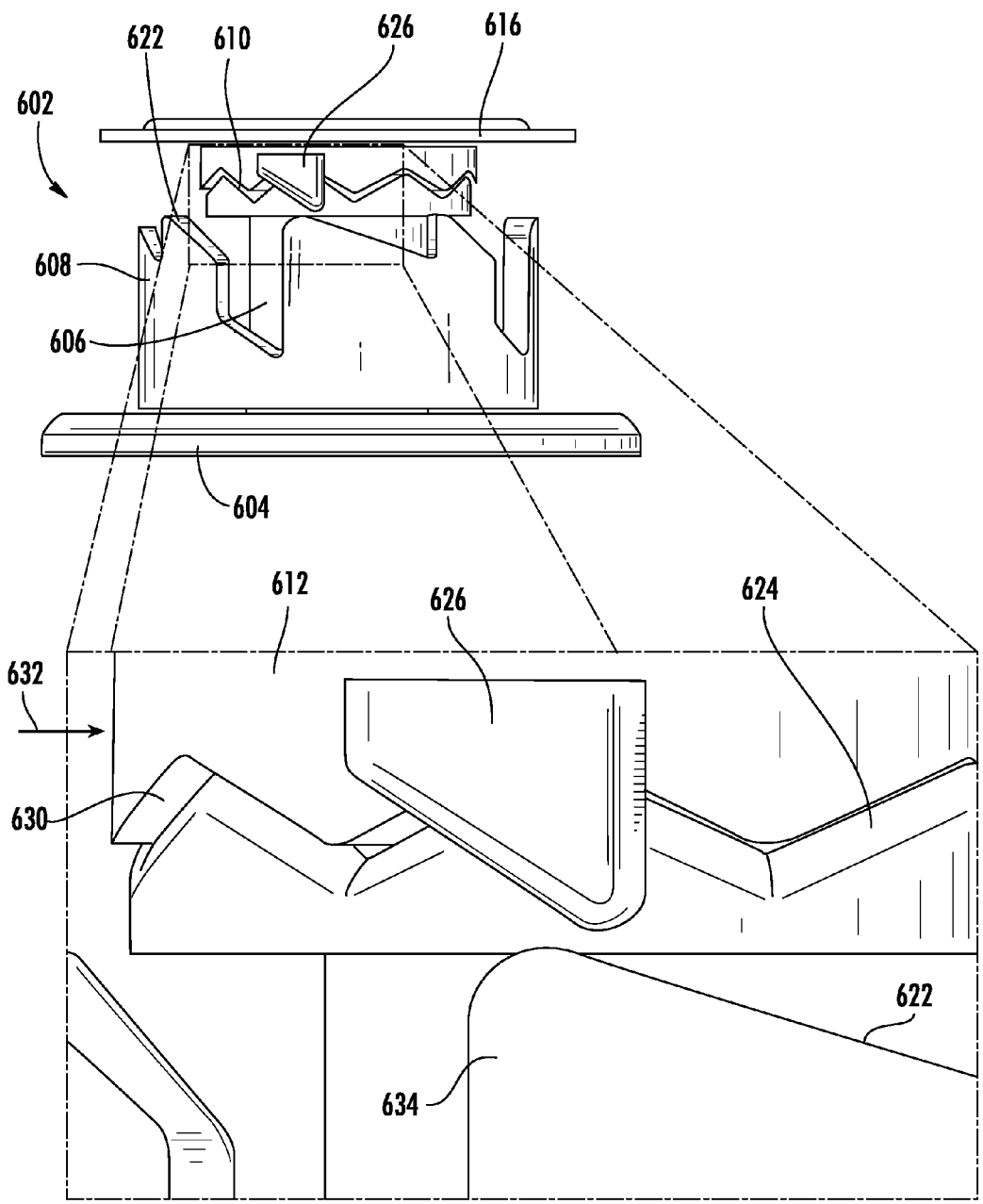
FIG. 16 illustrates the position of the follower of FIG. 12 during movement from the deployed position after separation from a wall.

FIGS. 15 and 16 illustrate movement of the displaceable post 602 when depressed by a user. As illustrated in FIG. 15, the follower 612 may define a third cam surface 630 configured to interact with the second cam surface 624 of the cam member 610. The angles defined by the second cam surface 624 and the third cam surface 630 may interact to create a force 632 on the follower 612. Initially the force 632 may be resisted as a result of the protrusion 626 remaining in contact with a wall 634 defined by the first cam surface 622.

However, as illustrated in FIG. 16, as the displaceable post 602 is depressed further, eventually the protrusion 626 comes out of contact with the wall 634, and as a result of the force 632 the follower 612 may rotate until the second cam surface 624 and the third cam surface 630 statically align. An audible click may created when the protrusion 626 comes out of contact with the wall 634 and the second cam surface 624 and the third cam surface 630 snap into alignment.

Figure 17:
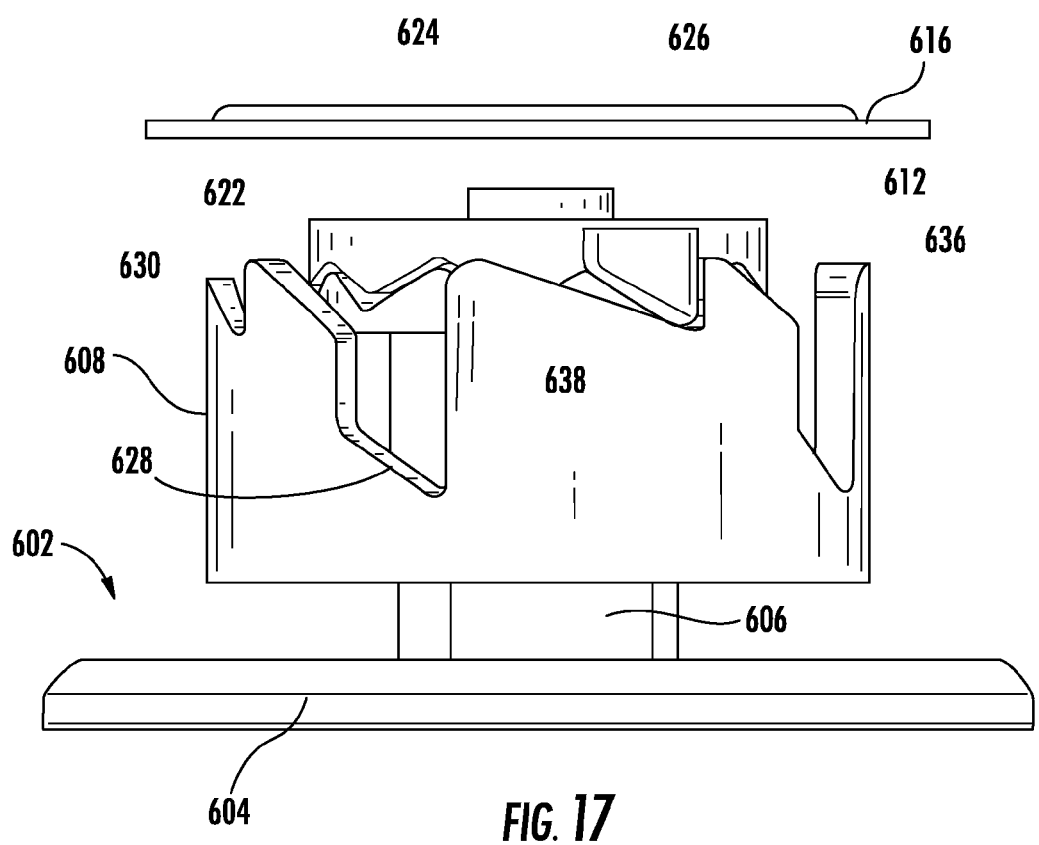
FIG. 17 illustrates the follower of FIG. 12 in a stored configuration.

As illustrated in FIG. 17, when the user releases the displaceable post 602, the spring 614 may force the protrusion 626 defined by the follower 612 into contact with the first cam surface 622, which may direct the protrusion into a stored recess 636. Thereby, the displaceable post 602 may be retained in a stored configuration in which the displaceable post is at least partially recessed in the displacement mechanism and the enlarged head 606 is at least partially inaccessible. As illustrated in FIG. 13, the second spring 618 may press against the cam member 610 to bias the displaceable post 602 inwardly, such that the displaceable post is retained in the stored configuration. In this regard, the second spring 618 may define a smaller spring rate than the spring 614 such that the protrusion 626 is not forced out of the stored recess 636.

The displaceable post 602 may be returned to the deployed configuration from the stored configuration when a user depresses the displaceable post again. In this regard, the interaction between the protrusion 626 and a wall 638 may function in the same manner as described above. Further, an additional audible click may be produced when the protrusion 626 releases from the wall 638.

Figure 18:
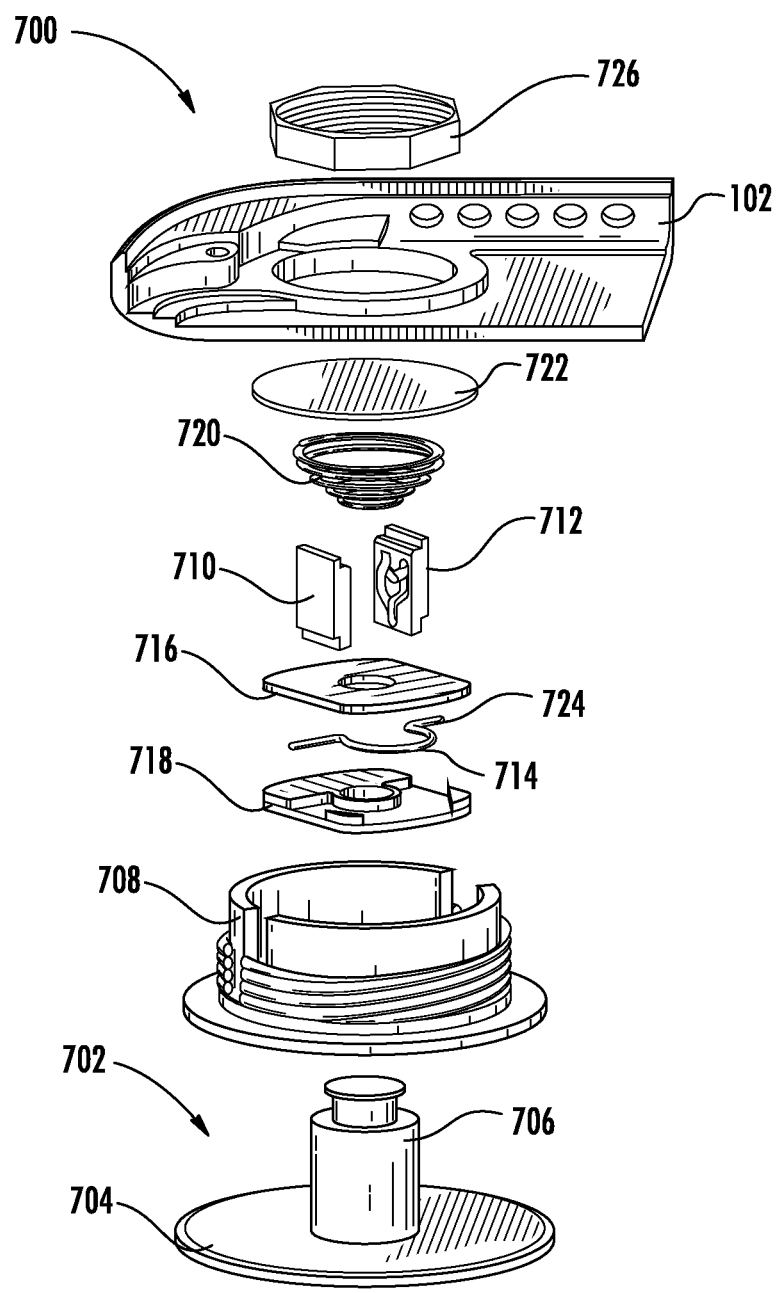
FIG. 18 illustrates an exploded view of an attachment mechanism comprising two laterally displaced cam members, a spring, and a follower according to an example embodiment of the present disclosure.
Figure 19:
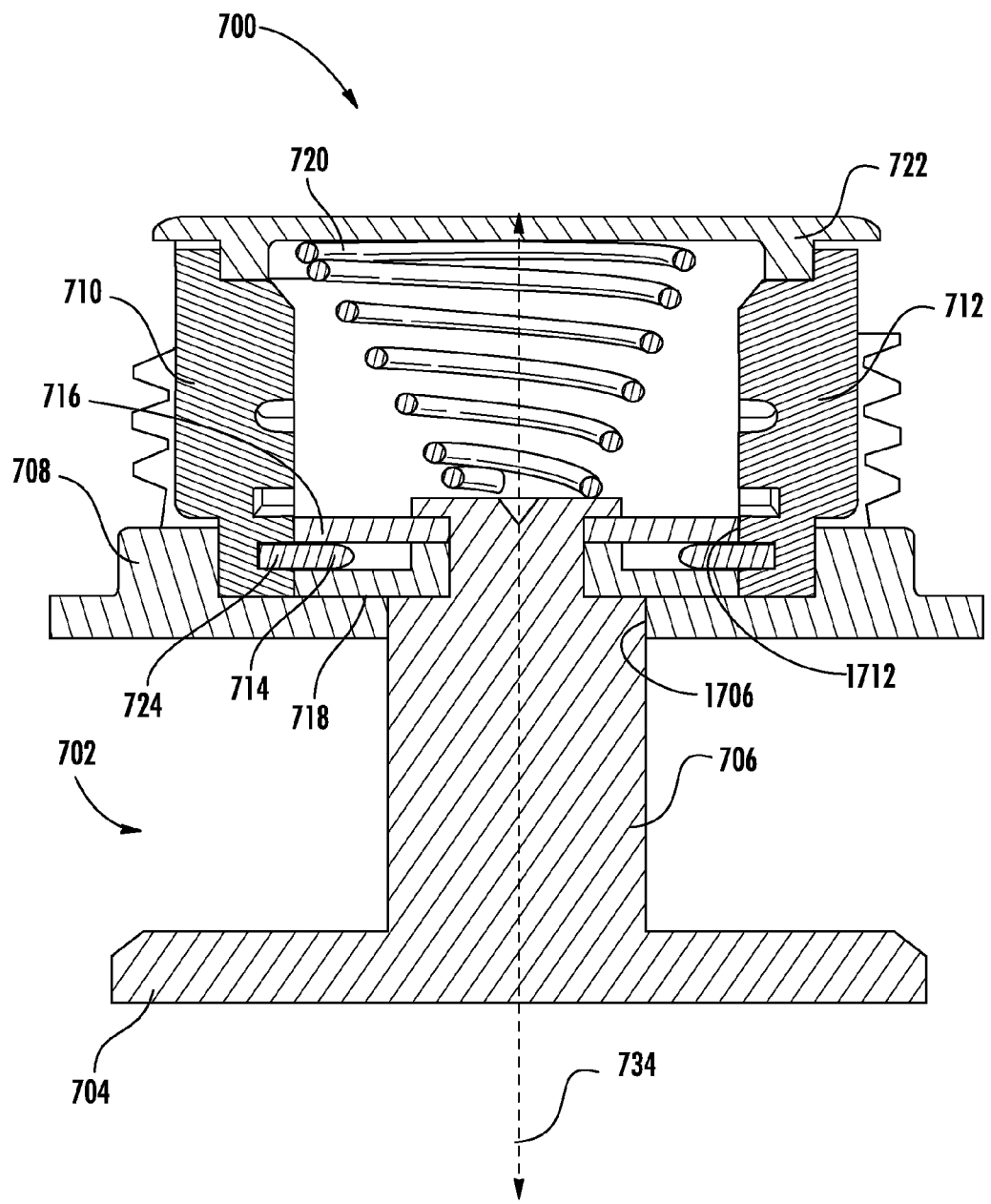
FIG. 19 illustrates a sectional view through the attachment mechanism of FIG. 18.

An exploded view of an additional embodiment of an attachment mechanism 700 configured to move between deployed and stored configurations is illustrated in FIG. 18. FIG. 19 illustrates the attachment mechanism 700 in an assembled and deployed configuration. As illustrated, the attachment mechanism 700 may include a displaceable post 702 comprising an attachment member in the form of an enlarged head 704 coupled to a shaft 706. The attachment mechanism 700 may further comprise a displacement mechanism comprising a mount 708, first and second cam members 710, 712, a follower 714, first and second piston members 716, 718, a spring 720, and a cap 722. The follower 714 may be sandwiched between the first and second piston member 716, 718, with at least one end of the follower defining a protrusion 724 extending therefrom. The shaft 706 of the displaceable post 702 may be received through the first and second piston members 716, 718, and the end of the shaft may be splayed such that the first and second members are retained at the end of the shaft with the follower retained therebetween. The cap 722 may hold the first and second cam members 710, 712, the follower 714, the first and second piston members 716, 718, and the spring 720 in the mount 708. The attachment mechanism 700 may be coupled to the housing 102 of the electronic device 100 via a nut 726.

Figure 20:
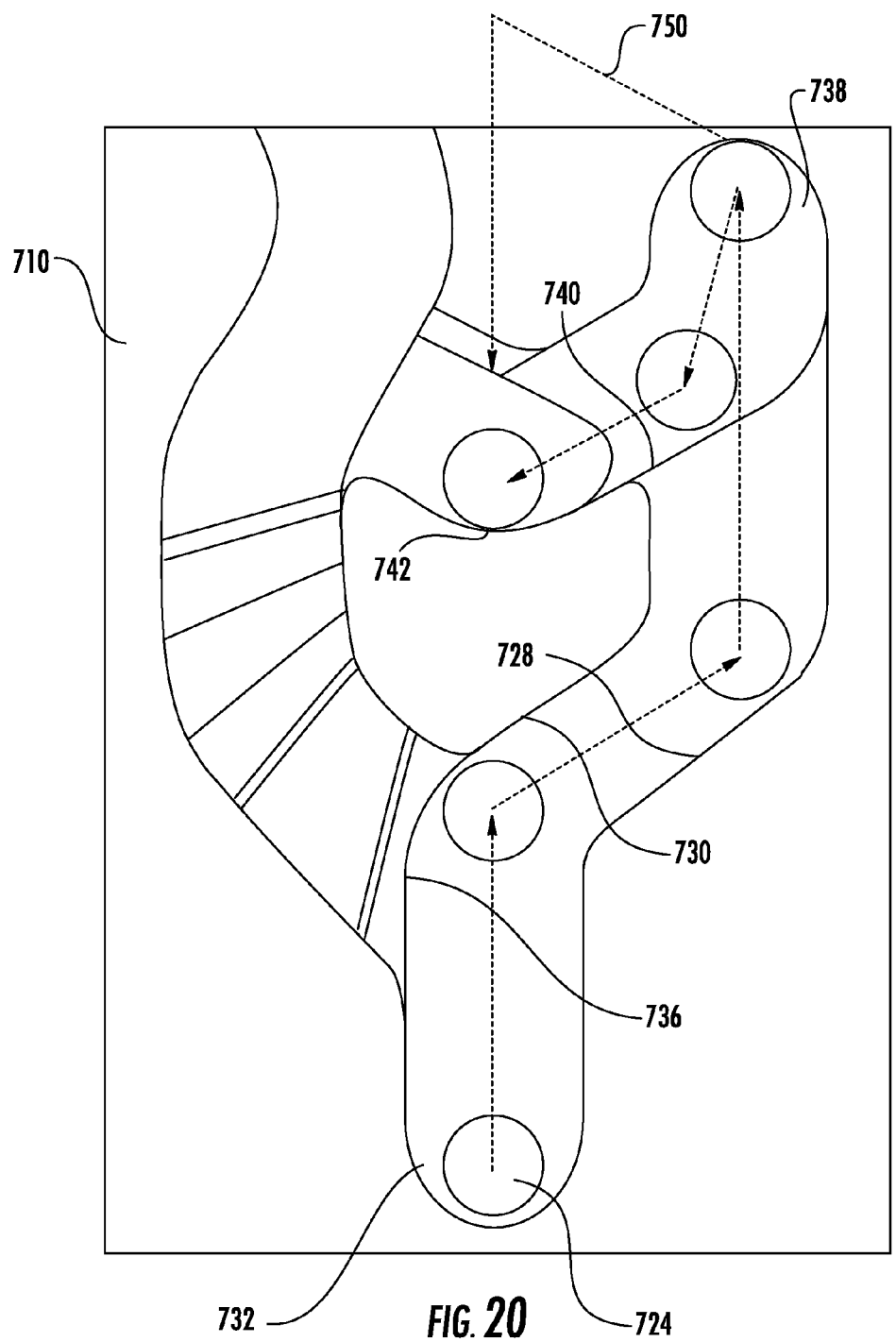
FIG. 20 illustrates movement of the follower of FIG. 18 from a deployed position to a recessed position.

The first cam member 710 and the second cam member 712 may each respectively define both a first cam surface 728 and a second cam surface 730. For example, as illustrated in FIG. 20, the first cam surface 728 may define a lower cam surface, and the second cam surface 730 may define an upper cam surface. In this regard, the first cam surface and 728 and the second cam surface 730 may be opposing and displaced from one another.

More particularly, FIG. 20 illustrates the movement of the protrusion 724 from a deployed position in which the displaceable post 702 extends from the displacement mechanism and the attachment member is exposed to a stored position in which the displaceable post is at least partially recessed in the displacement mechanism and the enlarged head 704 is at least partially inaccessible. As illustrated, the protrusion 724 may be initially received in a deployed recess 732 defined by the first cam surface 728. As the displaceable post 702 is depressed, the follower 714 is displaced along a longitudinal axis 734 (see, FIG. 19) of the displaceable post until the protrusion 724 contacts the second cam surface 730. A lip 736 defined by a change in elevation (into the page in terms of the illustrated view) may force the protrusion 724 to move to the right and contact the second cam surface 730.

Due to the second cam surface 730 defining an angle with respect to the longitudinal axis 730, the protrusion 724 may move against the second cam surface and then up into a first over-travel recess 738. As the displaceable post 702 is released, the spring 720 may direct the protrusion 724 in an opposing direction and a lip 740 defined by a change in elevation may direct the protrusion 724 into a stored recess 742 corresponding to the stored configuration.

Figure 21:
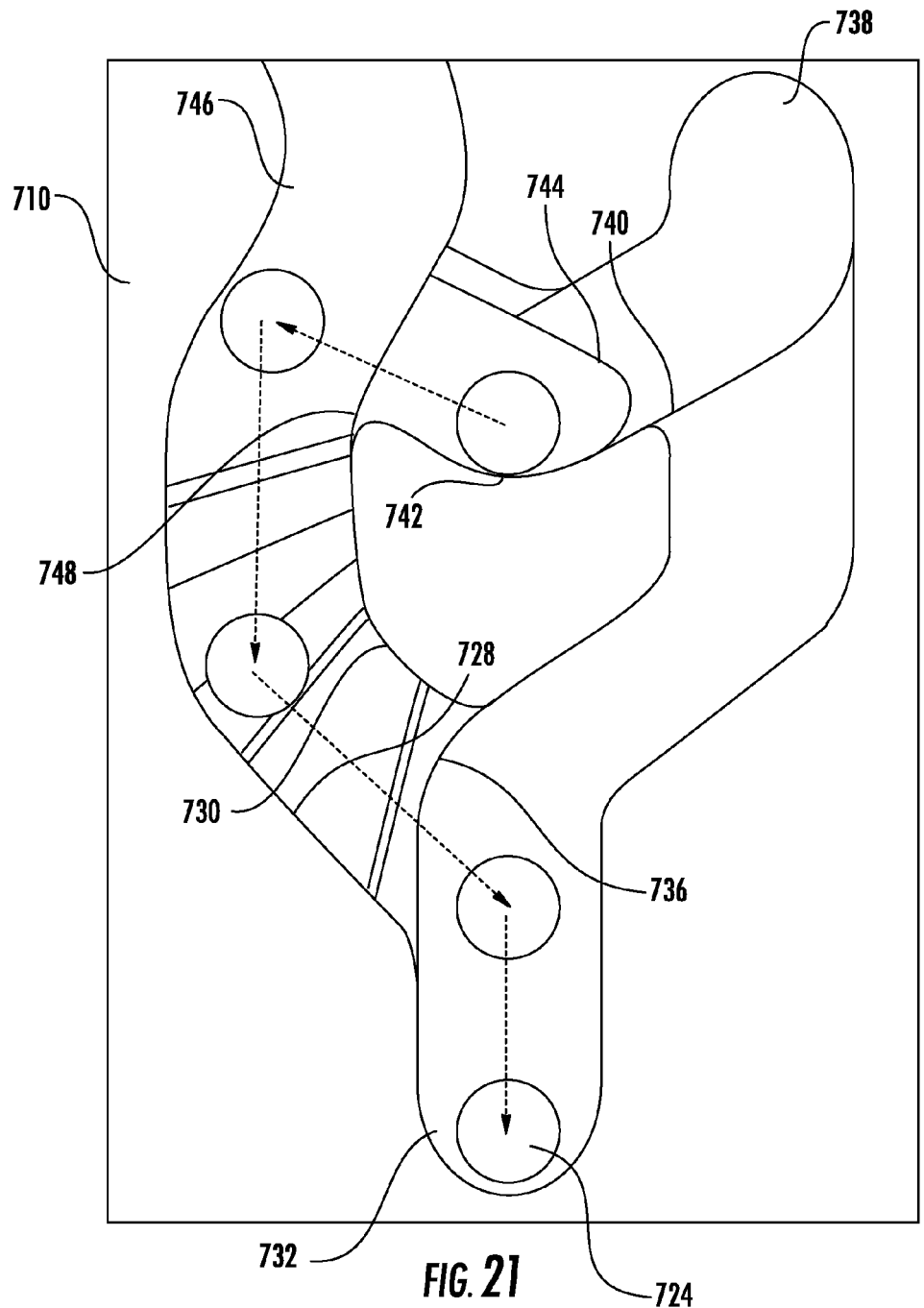
FIG. 21 illustrates movement of the follower of FIG. 18 from the recessed position to the deployed position.

As a user depresses the displaceable post 702 again, a lip 744 defined by a change in elevation and/or the second cam surface 730 may direct the protrusion 724 into a second over-travel recess 746, as illustrated in FIG. 21. Note that the second over-travel recess 746 may be open at an end thereof to allow for assembly of the attachment mechanism 700. As the user releases the displacement post 702, the protrusion 724 may return to the deployed recess 732 as assisted by one or both of the first cam surface 728 and a lip 748 defined by a change in elevation.

Note that use of the lip 740 may allow the cam member 710 to define a relatively smaller height along the longitudinal axis 734. In this regard, without use of the lip, the cam member 710 may have to define a path 750 which extends to a greater height, in order to avoid the protrusion falling back into the deployed recess 732 when the displaceable piston 702 is depressed. Accordingly, the lip 740 and the various other lips described above may allow for creation of a relatively smaller attachment mechanism 700.

Operation of the second cam member 712 may be substantially similar to that of the first cam member 710 and occur at substantially the same time. In this regard, the second cam member 712 may also include the first and second cam surfaces 728, 730. Note that although the attachment mechanism 700 is illustrated as including two cam members 710, 712 that are separated from one another in a direction perpendicular to the longitudinal axis 734 of the displaceable post 702, in another embodiment only one of the cam members 710, 712 may be employed, although use of two cam mechanisms may assist in maintaining alignment of the displaceable post during operation of the attachment mechanism 700.

Figure 22:
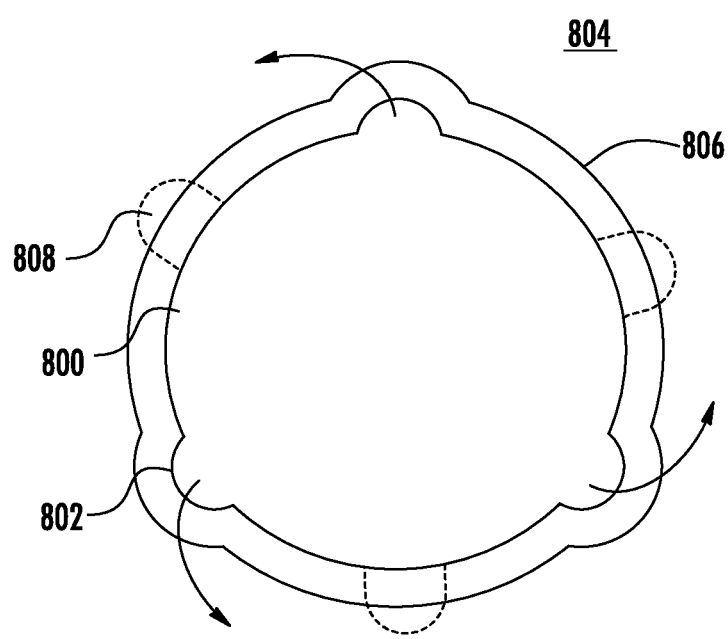
FIG. 22 illustrates a rotational mounting mechanism for an attachment mechanism according to an example embodiment of the present disclosure.

Note that although a nut is generally described as being employed to mount the attachment mechanism to a housing, various other embodiments of mounting mechanisms may be employed. For example, FIG. 22 illustrates use of a mount 800 that includes one or more bayonets 802. A housing 804 includes an aperture 806 defining a shape that substantially matches the mount 800, but is slightly oversized to allow the mount to be received therethrough. After being received therethough, the mount 800 may be rotated such that the bayonets 802 are locked into place. For example, the bayonets 802 may be received in recesses 808 defined at an inner surface of the housing 804.

Figure 23:
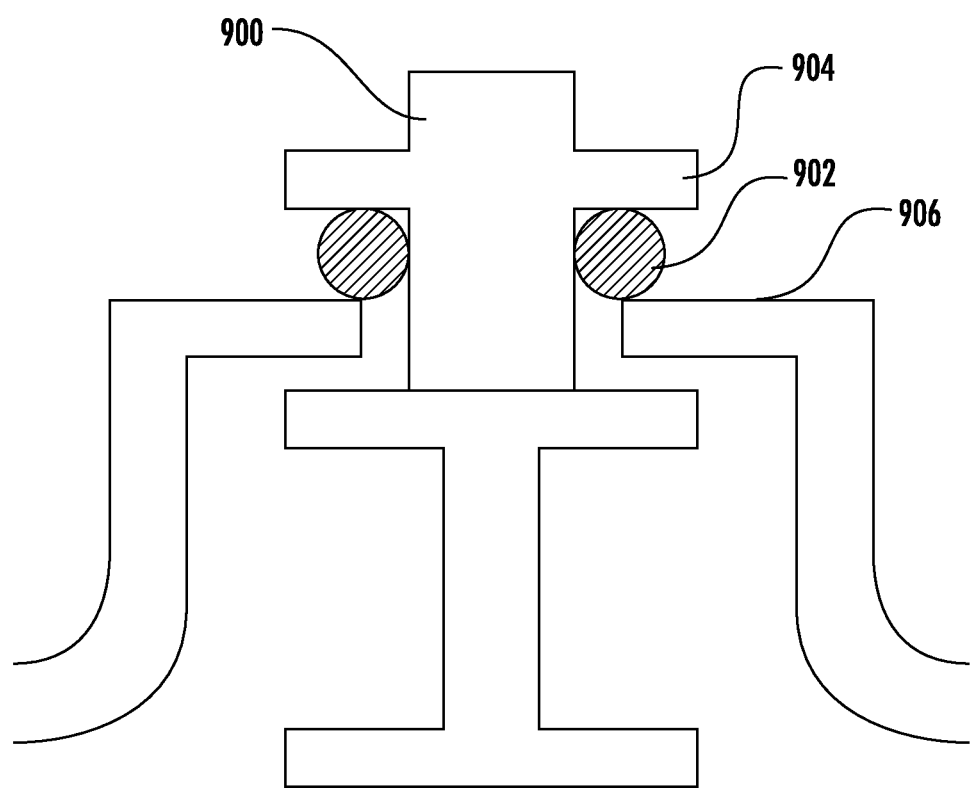
FIG. 23 illustrates a rotational mounting mechanism for an attachment mechanism including a spacer according to an example embodiment of the present disclosure.

FIG. 23 illustrates a side view of an alternate embodiment of a mount 900. The mount 900 is configured to receive a spacer 902 between one or more bayonets 904 and a housing 906. The spacer 902 may comprise an elastomeric o-ring in some embodiments. Accordingly, interference fit may be provided, as described above with respect to the embodiment of the mount 800 illustrated in FIG. 22. However, the spacer 902 may provide a degree of compliance to account for variations in the dimensions of the mount 900 and the housing 906. Further, the spacer 902 may seal the mount 900 to the housing 906 such that liquid ingress therebetween is resisted.

Figure 24:
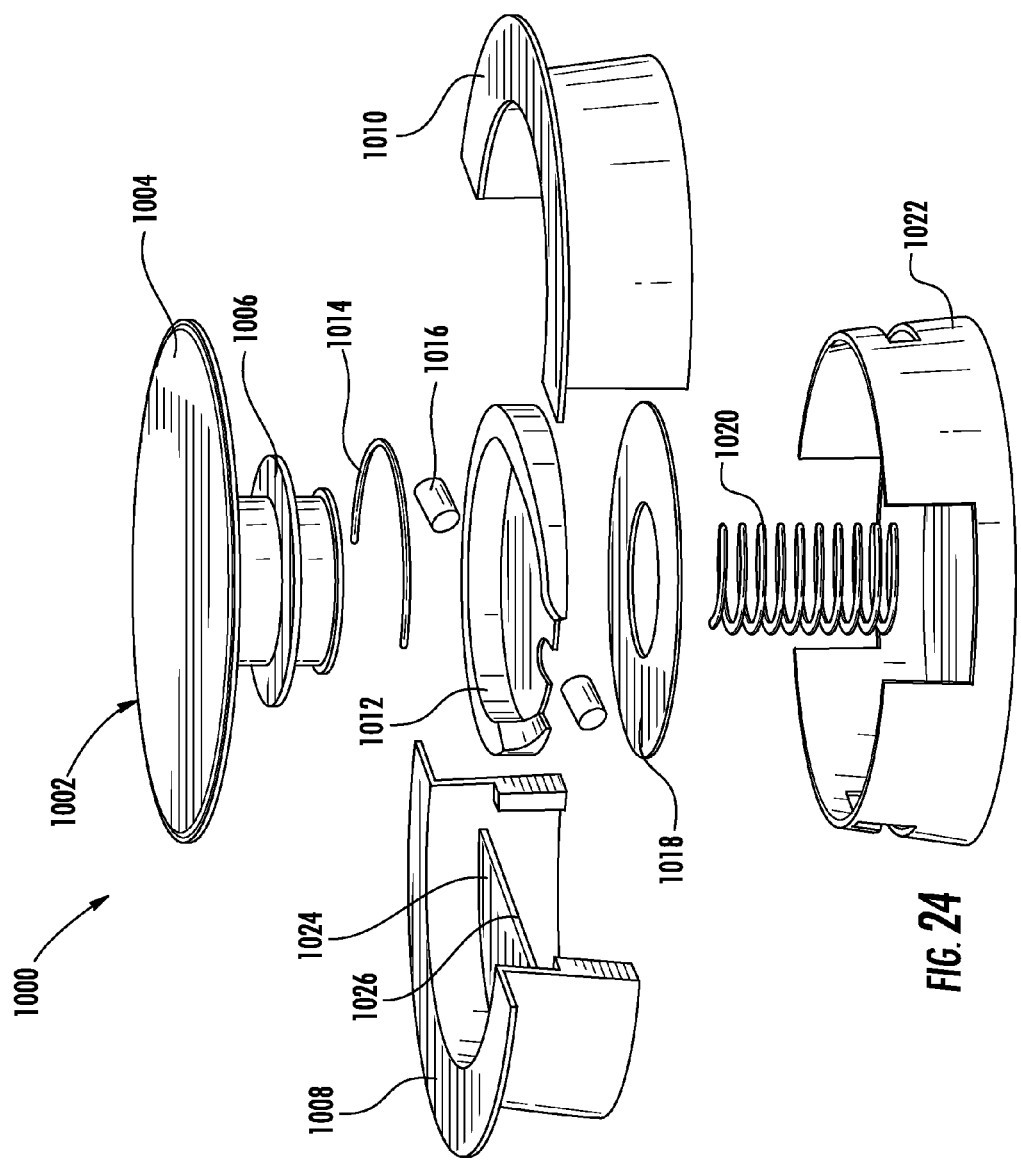
FIG. 24 illustrates an exploded view of an attachment mechanism comprising a two laterally displaced cam members, a spring, and a follower comprising pins according to an example embodiment of the present disclosure.
Figure 25:
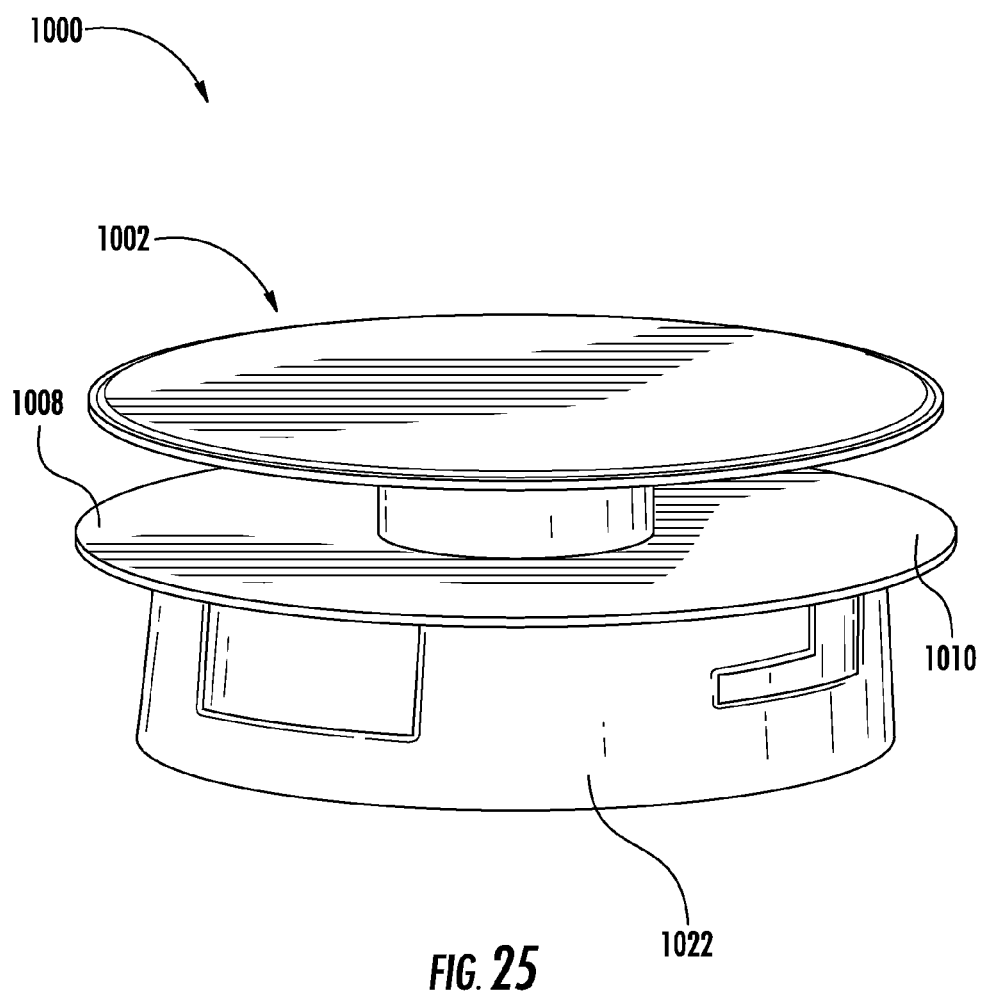
FIG. 25 illustrates a perspective view of the attachment mechanism of FIG. 24.

Various other embodiments of attachment mechanisms are also provided. For example, FIGS. 24 and 25 respectively illustrate exploded and assembled views of an alternate embodiment of an attachment mechanism 1000. As illustrated, the attachment mechanism 1000 may include a displaceable post 1002 comprising an attachment member in the form of an enlarged head 1004 coupled to a shaft 1006. The attachment mechanism 1000 may further comprise a displacement mechanism comprising first and second cam members 1008, 1010, a follower including a plate 1012, a spring 1014, and one or more bearings or pins 1016, and a washer 1018, a spring 1020, and a cap 1022. The cap 1022 may hold the first and second cam members 1008, 1010, the follower, and the spring 1020 therein. The first cam member 1008 and the second cam member 1010 may each respectively define a first cam surface 1024 and a second cam surface 1026. The pins 1016 may be in contact with the cam surfaces 1024, 1026 such that the follower moves between deployed and stored configurations, as described above.

Figure 26:
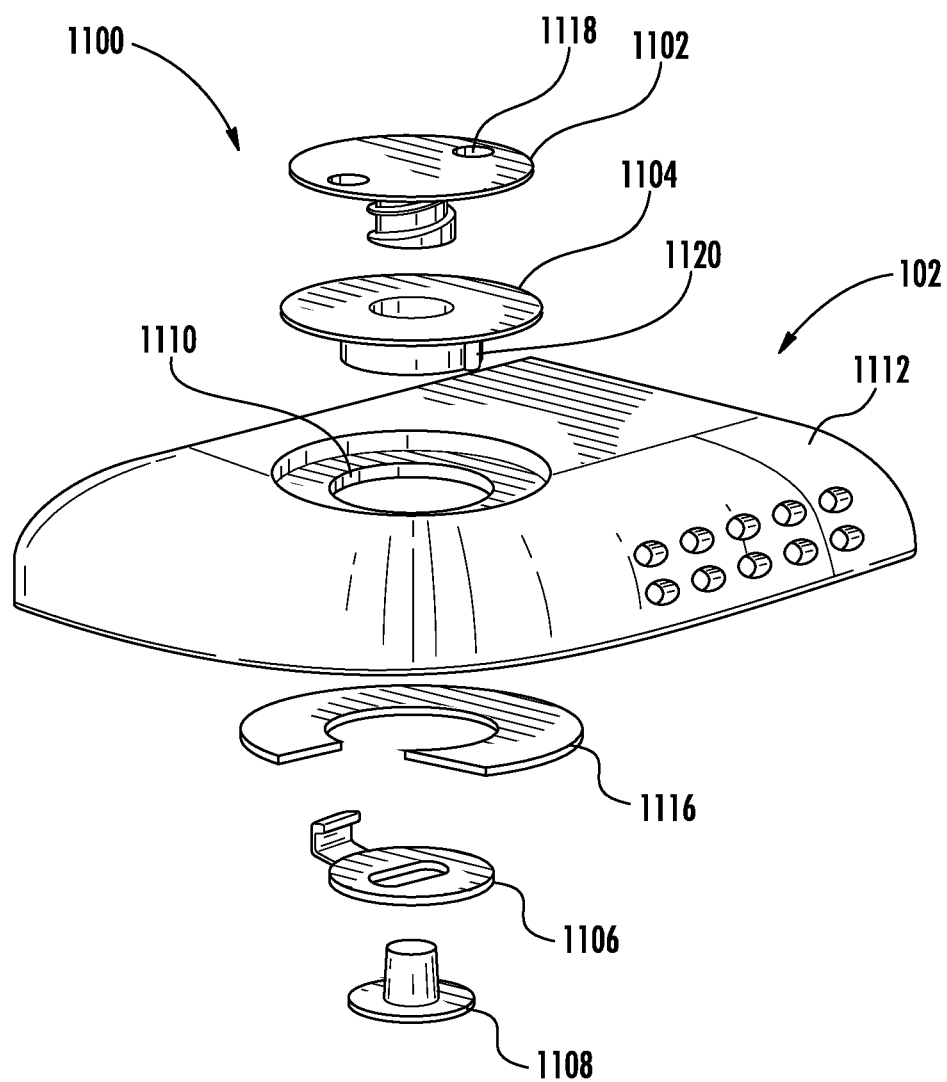
FIG. 26 illustrates an exploded view of an attachment mechanism comprising a post that is rotatable between deployed and stored configurations according to an example embodiment of the present disclosure.

FIG. 26 illustrates an embodiment of an attachment mechanism 1100 comprising a displaceable post 1102 comprising an enlarged head and a shaft. The attachment mechanism 1100 further comprises a displacement mechanism comprising a receptacle 1104, a follower 1106, and a fastener 1108. The displaceable post 1102 and the receptacle 1104 are inserted through an aperture 1110 in an outer surface 1112 of the housing 102, and the follower 1106, and the fastener 1108 are connected thereto proximate an inner surface 1114 of the housing (see, e.g., FIG. 27). More particularly, the displaceable post 1102 screws into the receptacle 1104, a clip 1116 engages the housing 102 and the receptacle, and the fastener 1108 holds the follower 1106 to the displaceable post.

Figure 27:
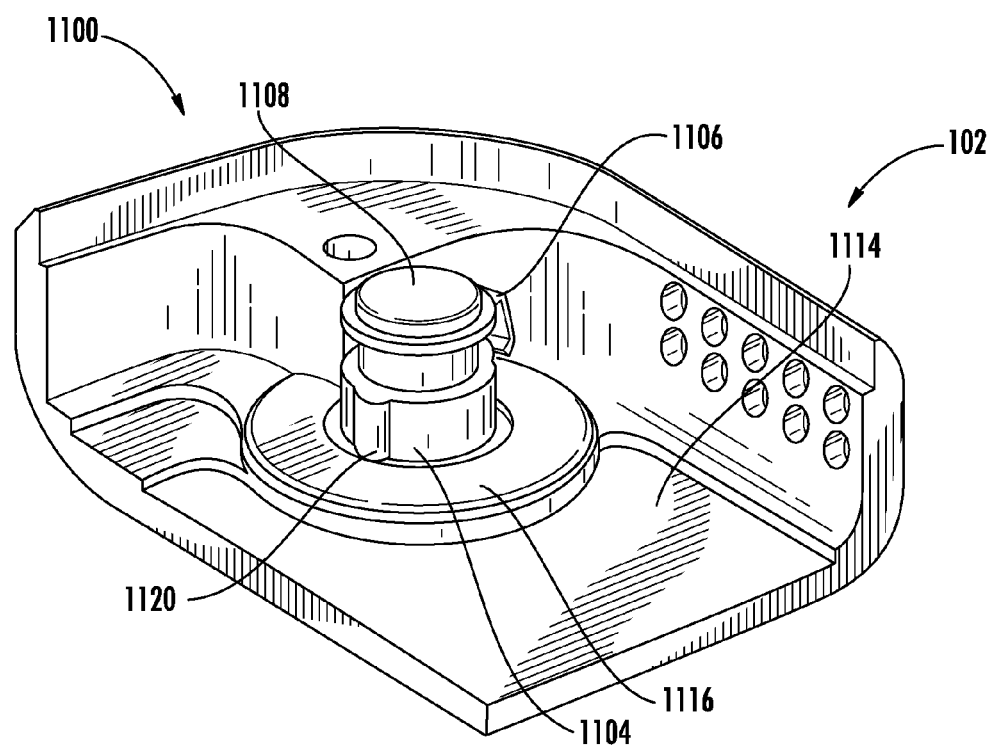
FIG. 27 illustrates a perspective view of the attachment mechanism of FIG. 26 in the stored configuration.
Figure 28:
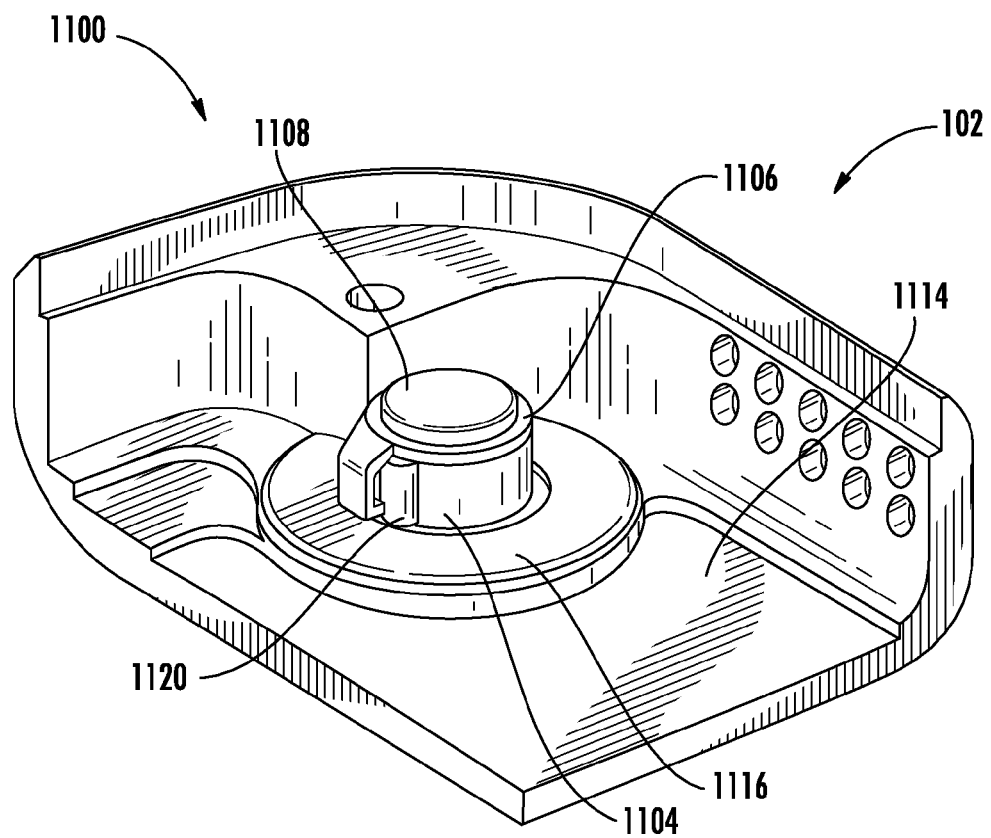
FIG. 28 illustrates a perspective view of the attachment mechanism of FIG. 26 in the deployed configuration.

As illustrated in FIG. 27, the displaceable post 1102 may be configured in a stored position in which the displaceable post is fully inserted into the receptacle 1104. However, the displaceable post 1102 may be moved to a deployed position, as illustrated in FIG. 28. In order to move the displaceable post 1102 between the stored and deployed positions, the displaceable post may be rotated. For example, as illustrated in FIG. 26, the displaceable post 1102 may include apertures 1118 configured to receive a tool to allow for rotation thereof, and both the post and the receptacle 1104 may be threaded.

As the post 1102 rotates, the follower 1106, which may be fixed thereto via the fastener 1108, may also rotate and contact a protrusion 1120 on an outer surface of the receptacle 1104. This contact may provide the user with a satisfying click and/or increase in force indicative of the displaceable post 1102 reaching the fully deployed configuration. In the deployed configuration, a lanyard or other accessory device may be coupled to the displaceable post 1102, whereas in the stored configuration the displaceable post may be at least partially recessed in the displacement mechanism and the enlarged head may be at least partially inaccessible.

Figure 29:
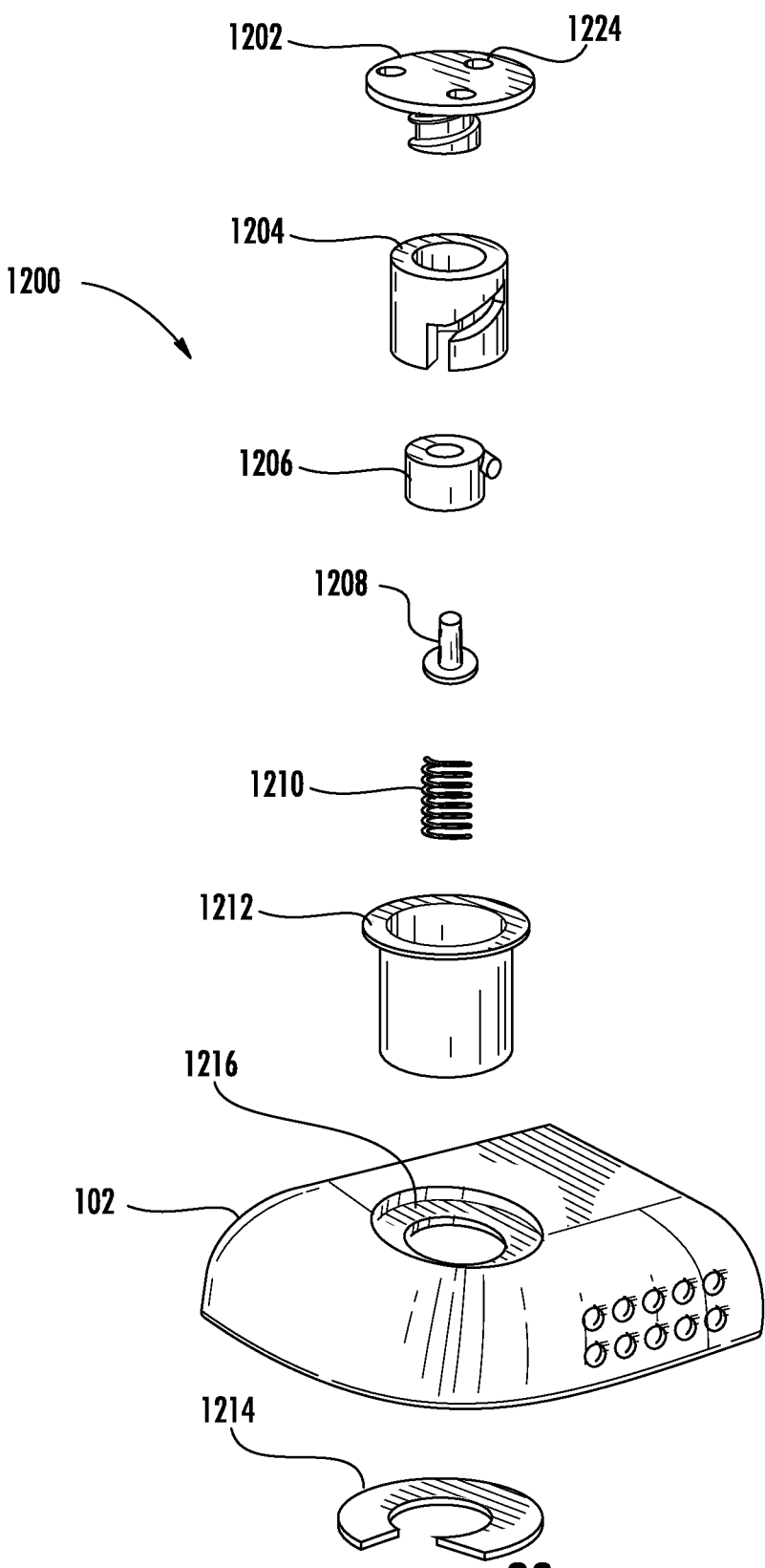
FIG. 29 illustrates an exploded view of an attachment mechanism comprising a follower and a spring-loaded post that is rotatable between deployed and stored configurations according to an example embodiment of the present disclosure.

FIG. 29 illustrates an additional embodiment of an attachment mechanism 1200. The attachment mechanism 1200 may include a displaceable post 1202 comprising an enlarged head and a shaft. The attachment mechanism 1200 may further comprise a displacement mechanism comprising a receptacle 1204, a follower 1206, a fastener 1208, a spring 1210, and a mount 1212. A clip 1214 may be connected to the mount 1212 such that the displacement assembly is retained in an aperture 1216 in the housing 102.

Figure 30:
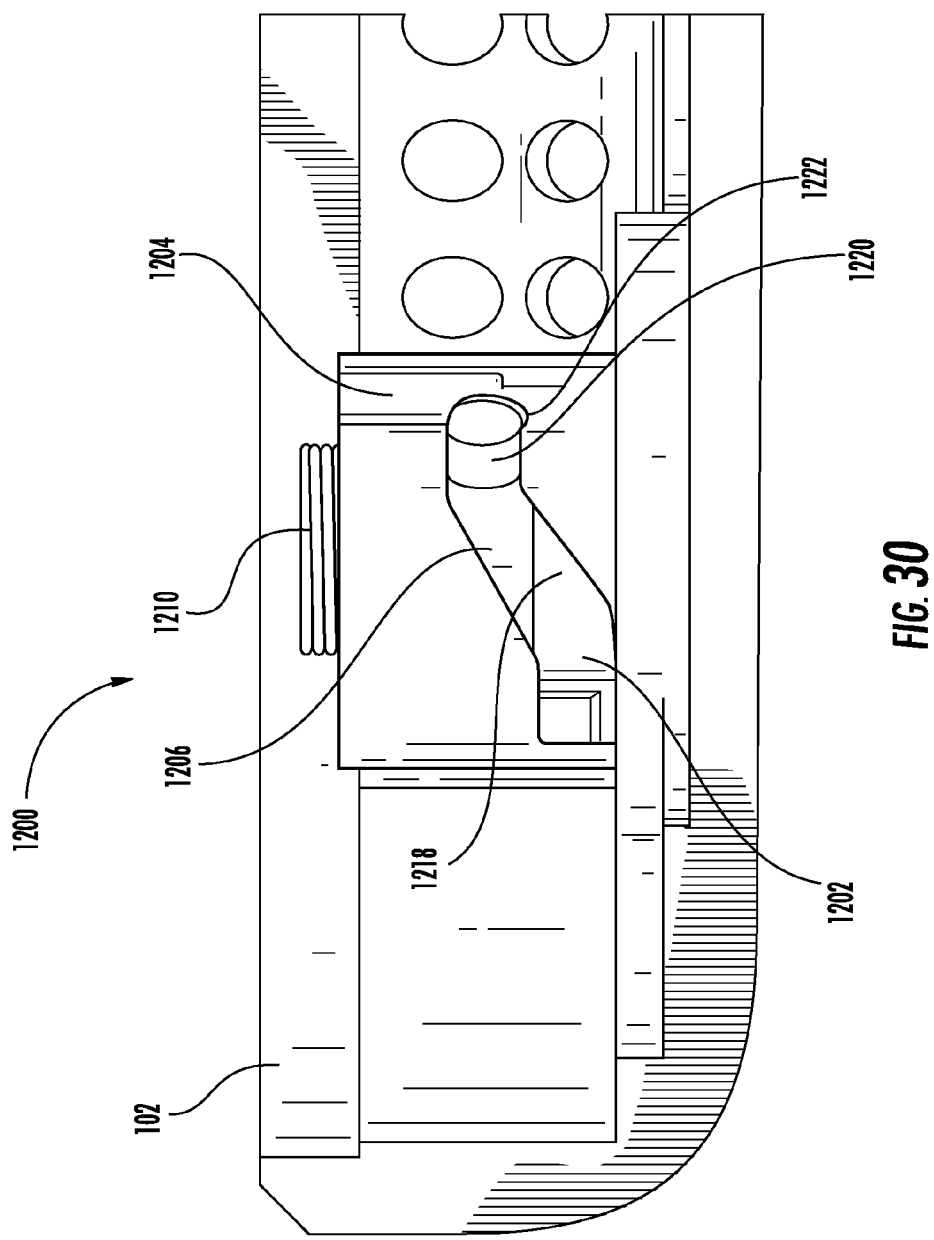
FIG. 30 illustrates the follower of FIG. 29 in a stored position.
Figure 31:
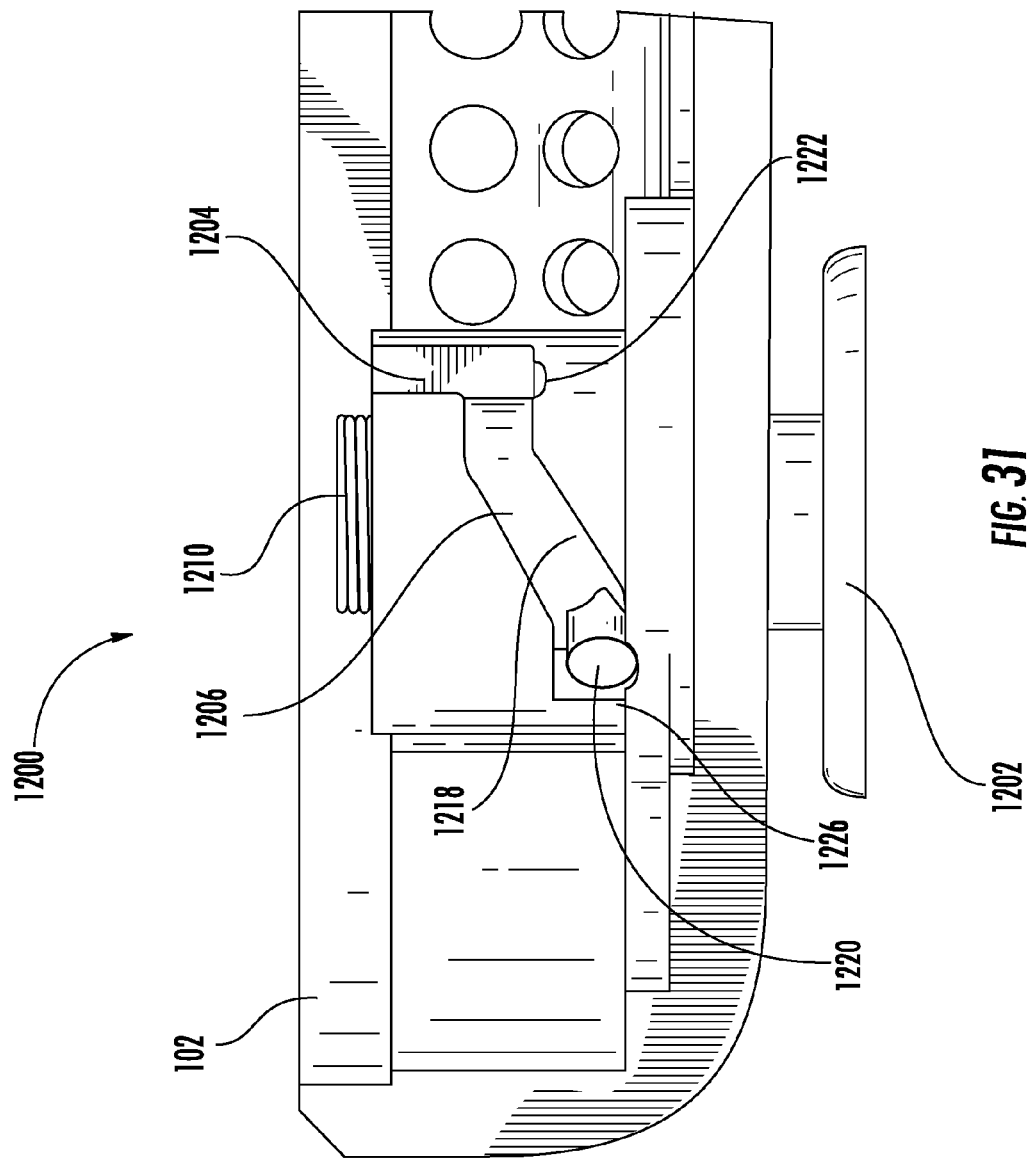
FIG. 31 illustrates the follower of FIG. 29 in a deployed position.

FIG. 30 illustrates the attachment mechanism in the stored configuration. As illustrated, the receptacle 1204 defines a cam surface 1218 which a protrusion 1220 defined by the follower 1206 moves against. More particularly, the spring 1210 pushes the protrusion 1220 against the cam surface 1218. As illustrated in FIG. 30, the protrusion 1220 may be held in a stored recess 1222 in the stored configuration. However, as illustrated in FIG. 31, when a user rotates the displaceable post 1202, for example by engaging a tool with apertures 1224 defined in the displaceable post, the protrusion 1220 may move against the cam surface 1218 and come to rest in a deployed recess 1226 corresponding to the deployed configuration.

Figure 32:
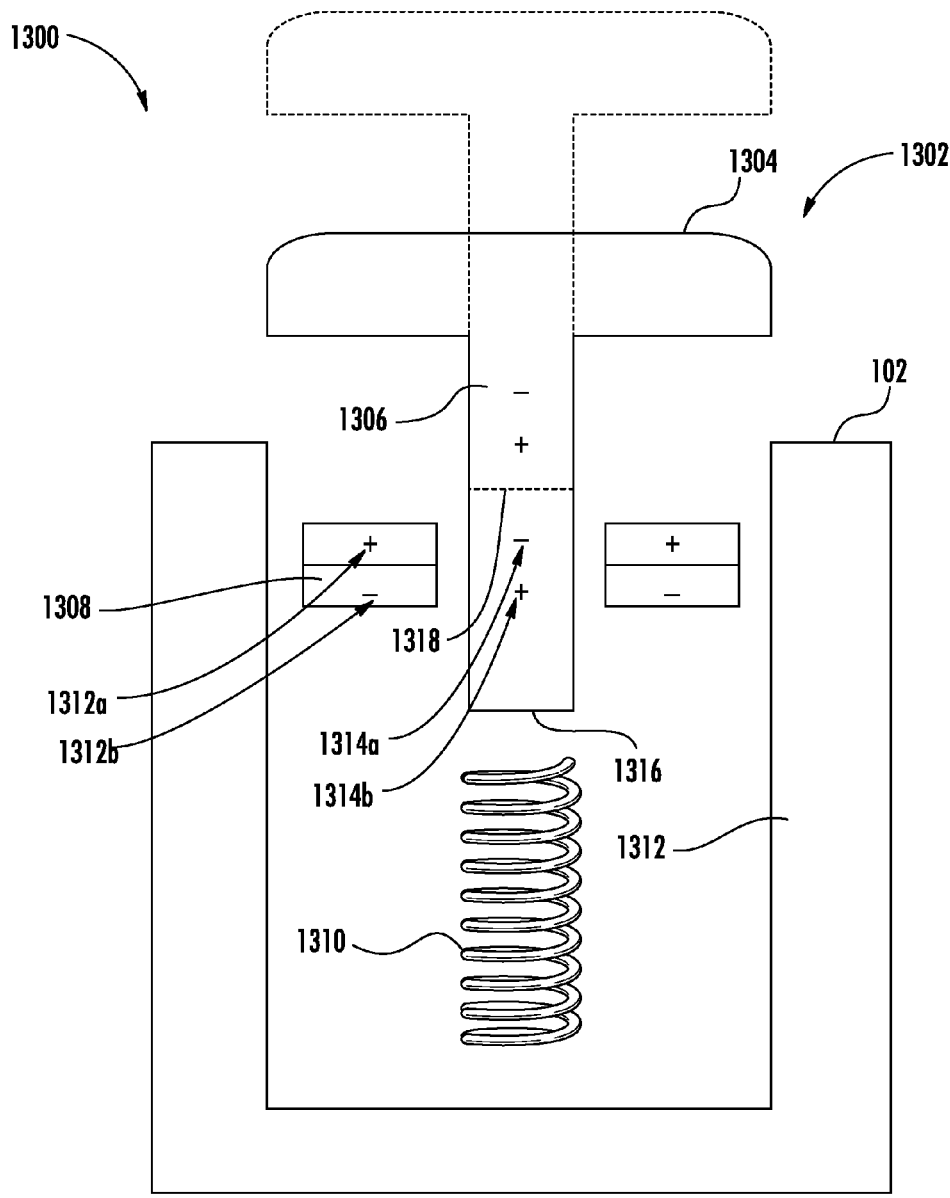
FIG. 32 illustrates an embodiment of an attachment mechanism comprising a magnetic element and spring configured to retain a displaceable post in stored and deployed configurations according to an example embodiment of the present disclosure.

An additional embodiment of an attachment mechanism 1300 is illustrated in FIG. 32. As illustrated, the attachment mechanism 1300 may comprise a displaceable post 1302 comprising an enlarged head 1304 and a shaft 1306. A displacement mechanism comprising a magnetic element 1308 and a spring 1310 may be received in a recess 1312 in the housing 102. The displaceable post 1302 may be received through the magnetic element 1308. The magnetic element 1308 may define magnetic fields $1312a,b$ that are oppositely oriented relative to magnetic fields $1314a,b$ defined by the displaceable post 1302. Accordingly, the magnetic element 1308 may push the displaceable shaft 1302 away therefrom. For example, in a stored configuration 1316 the magnetic element 1308 may push inwardly on the displaceable post 1302 such that the displaceable post is at least partially recessed in the displacement mechanism and the enlarged head 1304 is at least partially inaccessible.

However, when a user depresses and then quickly releases the displaceable post 1302, the spring 1310 may force the displaceable post outwardly from the stored configuration 1316 to a deployed configuration 1318 by overcoming the magnetic force. In the deployed configuration the displaceable post 1302 may extend from the displacement mechanism and the enlarged head 1304 may be exposed. The magnetic element 1308 may continue to push against the displaceable post 1302 in the deployed configuration 1318, but the displaceable post may be retained in the deployed configuration due to coupling with the spring 1308.

Figure 33:
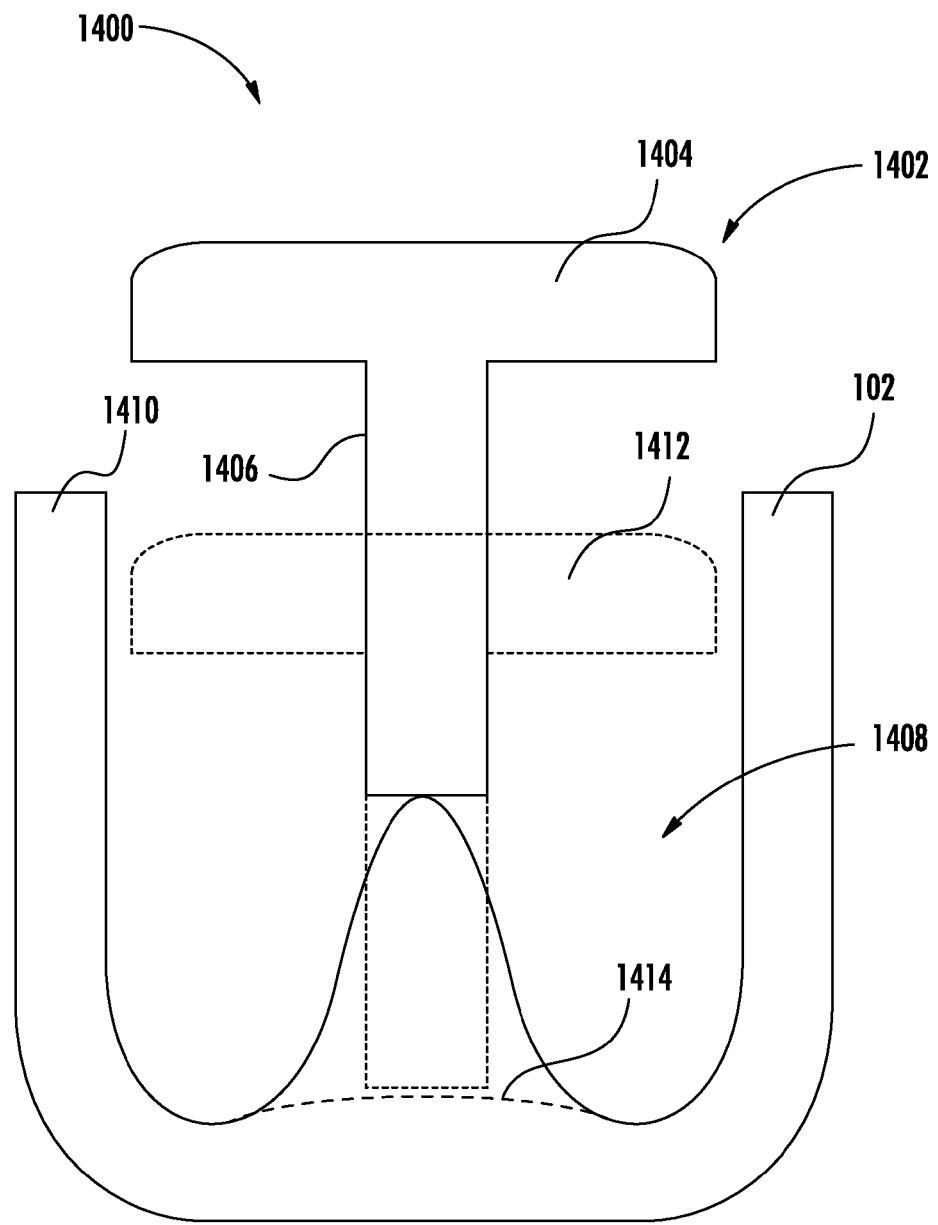
FIG. 33 illustrates an embodiment of an attachment mechanism comprising an flexible dome configured to retain a displaceable post in stored and deployed configurations according to an example embodiment of the present disclosure.

Another embodiment of an attachment mechanism 1400 is illustrated in FIG. 33. As illustrated, the attachment mechanism 1400 may comprise a displaceable post 1402 comprising an enlarged head 1404 and a shaft 1406. A displacement mechanism comprising a flexible dome 1408 may be received in a recess 1410 in the housing 102. The flexible dome 1408, which may be formed of an elastomeric material such as rubber, may define at least two stable configurations. In this regard, the flexible dome 1408 may be configurable between a protruding position 1412 in which the displaceable post 1402 is in a deployed configuration, and a collapsed position 1414 in which the displaceable post is in a stored configuration. In the deployed configuration the displaceable post 1402 extends from the recess 1410 and the enlarged head 1404 is exposed, and in the stored configuration the displaceable post is at least partially recessed in the recess and the enlarged head is at least partially inaccessible.

As described above, many of the attachment mechanisms provided herein may be moveable between deployed and stored configurations. In the deployed configuration an attachment member (e.g., an enlarged head) of a displaceable post thereof may be exposed. For example, the enlarged head may be displaced from a surface of the housing such that a lanyard or other accessory device may be coupled thereto. Conversely, in the stored configuration the attachment member may be at least partially inaccessible.

Figure 34:
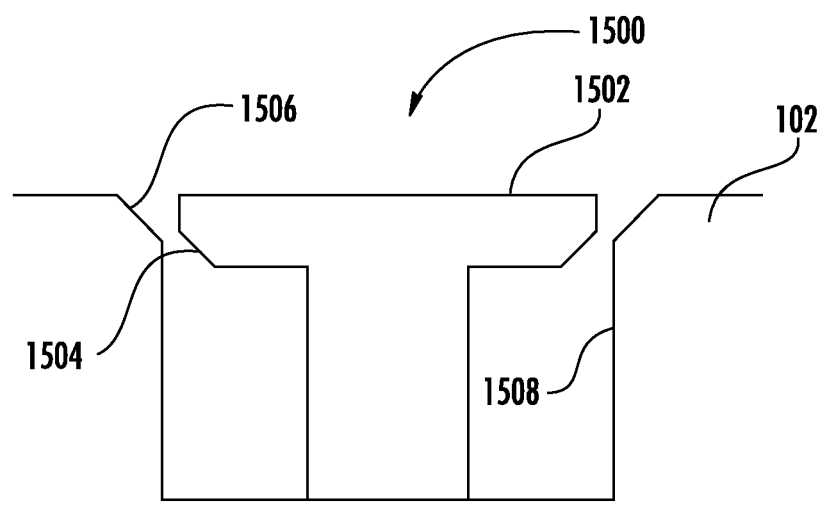
FIG. 34 illustrates a post and recess in a housing defining chamfers according to an example embodiment of the present disclosure.

In this regard, as illustrated in FIG. 34, in one embodiment a displaceable post 1500 may include an enlarged head 1502 defining a chamfer 1504 at a perimeter thereof. The chamfer 1504 on the enlarged head 1502 may correspond to a chamber 1506 around a recess 1508 in the housing 102. Thereby, the two chamfers 1504, 1506 may mate to define a smooth, flat exterior surface. Alternatively or additionally, the chamfers 1504, 1506 may facilitate movement of the displaceable post 1500 to the stored configuration by facilitating alignment thereof with the recess 1508 in the housing 102.

Alignment of displaceable posts with respect to the corresponding displacement mechanisms and/or recesses in which the attachment mechanisms are positioned may be facilitated in other manners. In this regard, multiple bearing surfaces may be employed to stabilize the displaceable post. For example, the embodiments of attachment mechanisms 500, 600, 700 illustrated in FIGS. 7, 13, and 19 each include first 1702, 1704, 1706 and second 1708, 1710, 1712 bearing surfaces which stabilize the displaceable posts 502, 602, 702 thereof. Accordingly, the displaceable posts 502, 602, 702 may be stabilized such that binding is avoided and smooth operation of the attachment mechanisms 500, 600, 700 is provided.

The attachment mechanisms provided herein may be formed from a variety of materials. In this regard, except where indicated otherwise, the parts of the attachment mechanisms may comprises metals such as stainless steel. In some embodiments the materials may be very small (e.g., the attachment mechanism may define dimensions of no more than 3-4 mm in any given direction. Accordingly, in some embodiments the parts of the attachment mechanisms may be formed by metal injection molding, which may be suitable for the manufacture of such small parts. Further, in some embodiments the parts may define a coating, such as a Teflon-nickel coating, which may assist in maintain smooth movement of the parts during operation.

Further, in some embodiments an additional flexible dome (e.g., the flexible dome 1408 illustrated in FIG. 33) may be combined with other embodiments of attachment mechanisms. For example, the flexible dome may be combined in series with a conical spring to require additional effort to provide a user with an indication that a displaceable post is fully depressed. In some embodiments a switch may be positioned such that it is actuated upon depression of the displaceable post. For example, the flexible dome may comprise a dome switch. Thereby, for example, the electronic device may be provided with a signal indicating whether the displaceable post is in the stored or deployed configurations.

Figure 35:
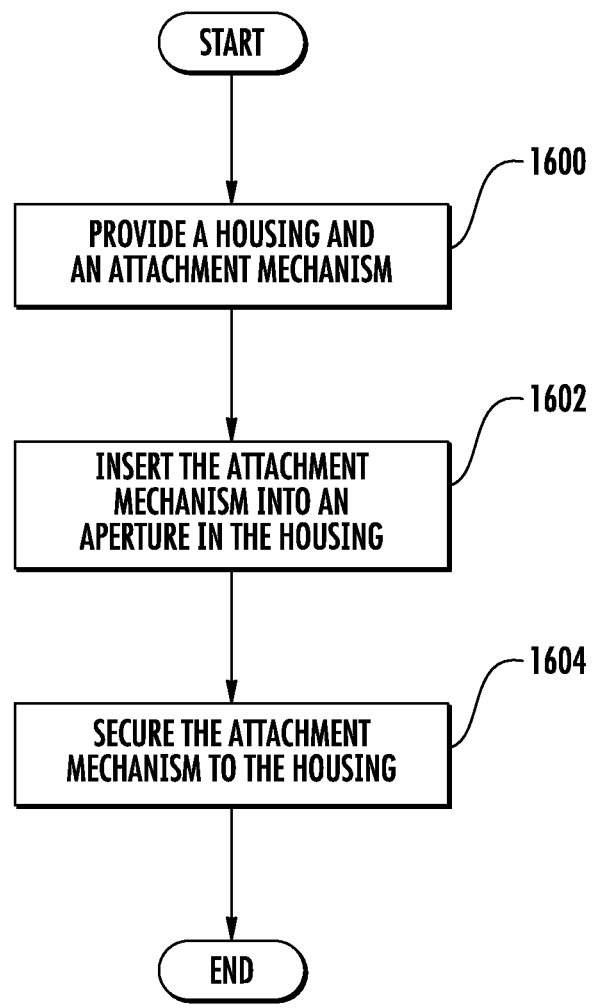
FIG. 35 illustrates a schematic diagram of a method for assembling an electronic device according to an example embodiment of the present disclosure.

Embodiments of related methods for assembling an electronic device are also provided. As illustrated in FIG. 35, a method may include providing a housing and an attachment mechanism at operation 1600. The housing may define an aperture and the attachment mechanism may comprise a displaceable post comprising an attachment member configured to engage an accessory device and a displacement mechanism configured to releasably retain the displaceable post in a deployed configuration in which the displaceable post extends from the displacement mechanism and the attachment member is exposed and a stored configuration in which the displaceable post is at least partially recessed in the displacement mechanism and the attachment member is at least partially inaccessible. Further, the method may include inserting the attachment mechanism into the aperture in the housing at operation 1602. The method may additionally include securing the attachment mechanism to the housing at operation 1604.

In some embodiments inserting the attachment mechanism into the aperture at operation 1602 may comprise inserting the attachment mechanism into the aperture with the attachment member of the displaceable post positioned proximate an outer surface of the housing. Inserting the attachment mechanism into the aperture in the housing at operation 1602 may also comprise overlapping an enlarged head defined by the attachment member with a recess defined at an outer surface of the housing surrounding the aperture. Further, securing the attachment mechanism to the housing at operation 1604 may comprise engaging a nut with the attachment mechanism and an inner surface of the housing. Also, securing the attachment mechanism to the housing at operation 1604 may comprise rotating the attachment mechanism to engage the housing via interference fit. The method may additionally include machining a chamfer at the outer surface of the housing surrounding the recess.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. An attachment mechanism, comprising:
   a displaceable post comprising a shaft secured with an attachment member configured to engage an accessory device;
   a cam member having a cam surface;
   a follower comprising a ring feature surrounding the shaft;

a protrusion extending outward from the ring feature to engage the cam surface; and a displacement mechanism comprising a conical spring configured to bias the displaceable post in a direction away from a housing of an electronic device, the displacement mechanism configured to releasably retain the displaceable post in:

a deployed configuration in which the displaceable post extends from the displacement mechanism and the shaft is exposed; and a stored configuration in which the displaceable post is partially recessed in the displacement mechanism and the shaft is partially inaccessible.

2. The attachment mechanism of claim 1, wherein the attachment member comprises an enlarged head coupled to the shaft.

3. The attachment mechanism of claim 2, wherein the displacement mechanism further comprises a first bearing surface and a second bearing surface, the first bearing surface and the second bearing surface configured to stabilize the displaceable post.

4. The attachment mechanism of claim 3, wherein the displacement mechanism further comprises:

a second cam member including a second cam surface; and a mount, wherein the cam surface is surface is located between the mount and the shaft, and wherein the protrusion is configured to move against the cam surface and the second cam surface.

5. The attachment mechanism of claim 4, further comprising a fastener positioned in an opening of the shaft, the fastener securing the follower with the displaceable post, wherein the fastener includes an extension that engages an end of the conical spring.

6. The attachment mechanism of claim 4, wherein the follower fully rotates about a longitudinal axis defined by the displaceable post when the displaceable post travels from the deployed configuration to the stored configuration and then to the deployed configuration.

7. The attachment mechanism of claim 4, wherein the cam member and the second cam member are displaced from one another along a longitudinal axis defined by the displaceable post.

8. The attachment mechanism of claim 7, wherein in response to a force received at the enlarged head, the protrusion travels from the cam surface to the second cam surface.

9. The attachment mechanism of claim 7, wherein in response to a second force received at the enlarged head, the protrusion travels from the second cam surface to the cam surface.

10. The attachment mechanism of claim 4, further comprising a cap secured with the mount, wherein the cap and the mount combine to define a cover for the cam member, the second cam member, the follower, and the conical spring.

11. The attachment mechanism of claim 10, wherein the mount comprises a threaded region for threaded engaged with the housing.

12. The attachment mechanism of claim 11, wherein the conical spring engages the cap.

13. The attachment mechanism of claim 12, wherein an angle of the cam surface configured to direct the follower toward the deployed configuration is greater than an angle of cam surface configured to direct the follower toward the stored configuration.

14. An electronic device, comprising
a housing; and an attachment mechanism disposed on an exterior region of the housing, the attachment mechanism comprising:

a mount;

a displaceable post extending partially through the mount, the displace post secured with an attachment member configured to engage an accessory device; and a displacement mechanism comprising a conical spring configured to bias the displaceable post outwardly, the displacement mechanism further comprising a first cam member, a second cam member, and a follower comprising a protrusion, wherein the displacement mechanism is configured to releasably retain the displaceable post in:

a deployed configuration in which the displaceable post is exposed to receive the accessory device; and a stored configuration in which the displaceable post is at least partially inaccessible, wherein the displaceable post rotates, relative to the housing, about a longitudinal axis to change from the deployed configuration to the stored configuration, wherein in response to a force to the displace post, the protrusion is configured to move against the first cam member and the second cam member when the displaceable post changes from the deployable configuration to the stored configuration, or vice versa; and a nut disposed on an interior region of the housing opposite the exterior region, the nut used to couple the attachment mechanism with the housing.

15. The electronic device of claim 14, wherein when the force is removed from the displaceable post, the conical spring biases the displaceable post away from the housing.

16. The electronic device of claim 14, wherein:

the first cam member comprises a first cam surface formed at a first angle that directs the protrusion toward the deployed configuration, the second cam member comprises a second cam surface formed at a second angle that directs the protrusion toward the stored configuration, and the first angle is greater than the second angle.

17. The electronic device of claim 14, wherein the displaceable post rotates about the longitudinal axis and relative to the displacement mechanism when the displaceable post changes from the deployable configuration to the stored configuration, or vice versa.

18. The electronic device of claim 14, wherein the displaceable post is free of rotation about the longitudinal axis relative to the displacement mechanism when the displaceable post changes from the deployable configuration to the stored configuration, or vice versa.

19. A method for assembling an electronic device having a housing that includes an aperture, the method comprising:

providing an attachment mechanism comprising:

a displaceable post comprising a shaft secured with an attachment member configured to engage an accessory device;

a cam member having a cam surface;

a follower comprising a ring feature surrounding the shaft;

a protrusion extending outward from the ring feature to engage the cam surface; and a displacement mechanism comprising a conical spring configured to bias the displaceable post outwardly, the displacement mechanism configured to releasably retain the displaceable post in:

a deployed configuration in which the displaceable post extends from the displacement mechanism and the attachment member is exposed; and a stored configuration in which the displaceable post is at least partially recessed in the displacement mechanism and the attachment member is at least partially inaccessible;

inserting the attachment mechanism into the aperture in the housing; and securing the attachment mechanism to the housing.

20. The method of claim 19, wherein inserting the attachment mechanism into the aperture comprises inserting the attachment mechanism into the aperture with the attachment member of the displaceable post positioned proximate an outer surface of the housing.

21. The method of claim 19, wherein securing the attachment mechanism to the housing comprises engaging a nut with the attachment mechanism and an inner surface of the housing.

22. The electronic device of claim 14, wherein the follower comprises a ring feature surrounding a shaft, wherein the protrusion extends outward with respect to the ring feature.

\* \* \* \* \*